US012016052B2

(12) United States Patent
Wang et al.

(10) Patent No.: US 12,016,052 B2
(45) Date of Patent: Jun. 18, 2024

(54) TRANSMISSION OF CHANNEL OCCUPANCY TIME-SHARING INFORMATION (COT-SI) RESERVING A COT FOR SIDELINK COMMUNICATIONS IN UNLICENSED BANDS

(71) Applicant: QUALCOMM Incorporated, San Diego, CA (US)

(72) Inventors: Xiaojie Wang, Hillsborough, NJ (US); Jing Sun, San Diego, CA (US); Chih-Hao Liu, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/361,978

(22) Filed: Jun. 29, 2021

(65) Prior Publication Data

US 2022/0417988 A1    Dec. 29, 2022

(51) Int. Cl.
*H04W 74/0808* (2024.01)
*H04W 72/20* (2023.01)
*H04W 16/14* (2009.01)

(52) U.S. Cl.
CPC ....... *H04W 74/0808* (2013.01); *H04W 72/20* (2023.01); *H04W 16/14* (2013.01)

(58) Field of Classification Search
None
See application file for complete search history.

(56) References Cited

U.S. PATENT DOCUMENTS

| | | | | |
|---|---|---|---|---|
| 2020/0187250 | A1* | 6/2020 | Bhattad | H04W 16/28 |
| 2020/0314804 | A1* | 10/2020 | Shin | H04W 24/10 |
| 2020/0336253 | A1* | 10/2020 | He | H04L 1/1887 |
| 2021/0006318 | A1* | 1/2021 | Kim | H04L 1/1867 |
| 2022/0022169 | A1* | 1/2022 | Peng | H04W 72/02 |
| 2022/0061090 | A1* | 2/2022 | Fehrenbach | H04W 74/0808 |
| 2022/0086860 | A1* | 3/2022 | Panteleev | H04L 1/0068 |
| 2022/0167423 | A1* | 5/2022 | Aldana | H04W 74/004 |
| 2022/0272727 | A1* | 8/2022 | Salim | H04L 5/0051 |
| 2022/0272754 | A1* | 8/2022 | Lei | H04W 74/0866 |
| 2022/0377722 | A1* | 11/2022 | Yao | H04L 1/1825 |
| 2022/0417917 | A1* | 12/2022 | Fakoorian | H04W 72/1263 |

* cited by examiner

*Primary Examiner* — Jason E Mattis
*Assistant Examiner* — Bao G Nguyen
(74) *Attorney, Agent, or Firm* — QUALCOMM Incorporated

(57) ABSTRACT

Wireless communications systems and methods related to channel occupancy time-sharing information (COT-SI) reservation of a COT for sidelink communications in an unlicensed band are provided. In some aspects, a user equipment (UE) performs a channel access procedure to acquire one or more COTs in a sidelink channel over an unlicensed new radio (NR) band. Further, the UE transmits a COT sharing information (COT-SI) configured to reserve the one or more COTs for a future transmission via the sidelink channel.

29 Claims, 10 Drawing Sheets

TRANSMISSION OF CHANNEL OCCUPANCY TIME-SHARING INFORMATION (COT-SI) RESERVING A COT FOR SIDELINK COMMUNICATIONS IN UNLICENSED BANDS

TECHNICAL FIELD

This application relates to wireless communication systems, and more particularly to the transmission of channel occupancy time-sharing information (COT-SI) carrying reservation information of a COT reserved for sidelink communications in unlicensed bands.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects of the disclosure, a method of wireless communication performed by a first user equipment (UE) comprises performing a channel access procedure to acquire one or more channel occupancy times (COTs) in a sidelink channel over an unlicensed new radio (NR) band; and transmitting a COT sharing information (COT-SI) configured to reserve the one or more COTs for a future transmission via the sidelink channel.

In some aspects, a first user equipment (UE) comprises a memory and a processor operatively coupled to the memory and configured to perform a channel access procedure to acquire one or more channel occupancy times (COTs) in a sidelink channel over an unlicensed new radio (NR) band. The UE further comprises a transceiver coupled to the processor and configured to transmit a COT sharing information (COT-SI) configured to reserve the one or more COTs for a future transmission via the sidelink channel.

In some aspects, a non-transitory computer-readable medium (CRM) has program code recorded thereon, the program code comprising: code for causing a first user equipment (UE) to perform a channel access procedure to acquire one or more channel occupancy times (COTs) in a sidelink channel over an unlicensed new radio (NR) band; and code for causing the first UE to transmit a COT sharing information (COT-SI) configured to reserve the one or more COTs for a future transmission via the sidelink channel.

In some aspects, a first user equipment (UE) comprises means for performing a channel access procedure to acquire one or more channel occupancy times (COTs) in a sidelink channel over an unlicensed new radio (NR) band; and means for transmitting a COT sharing information (COT-SI) configured to reserve the one or more COTs for a future transmission via the sidelink channel.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
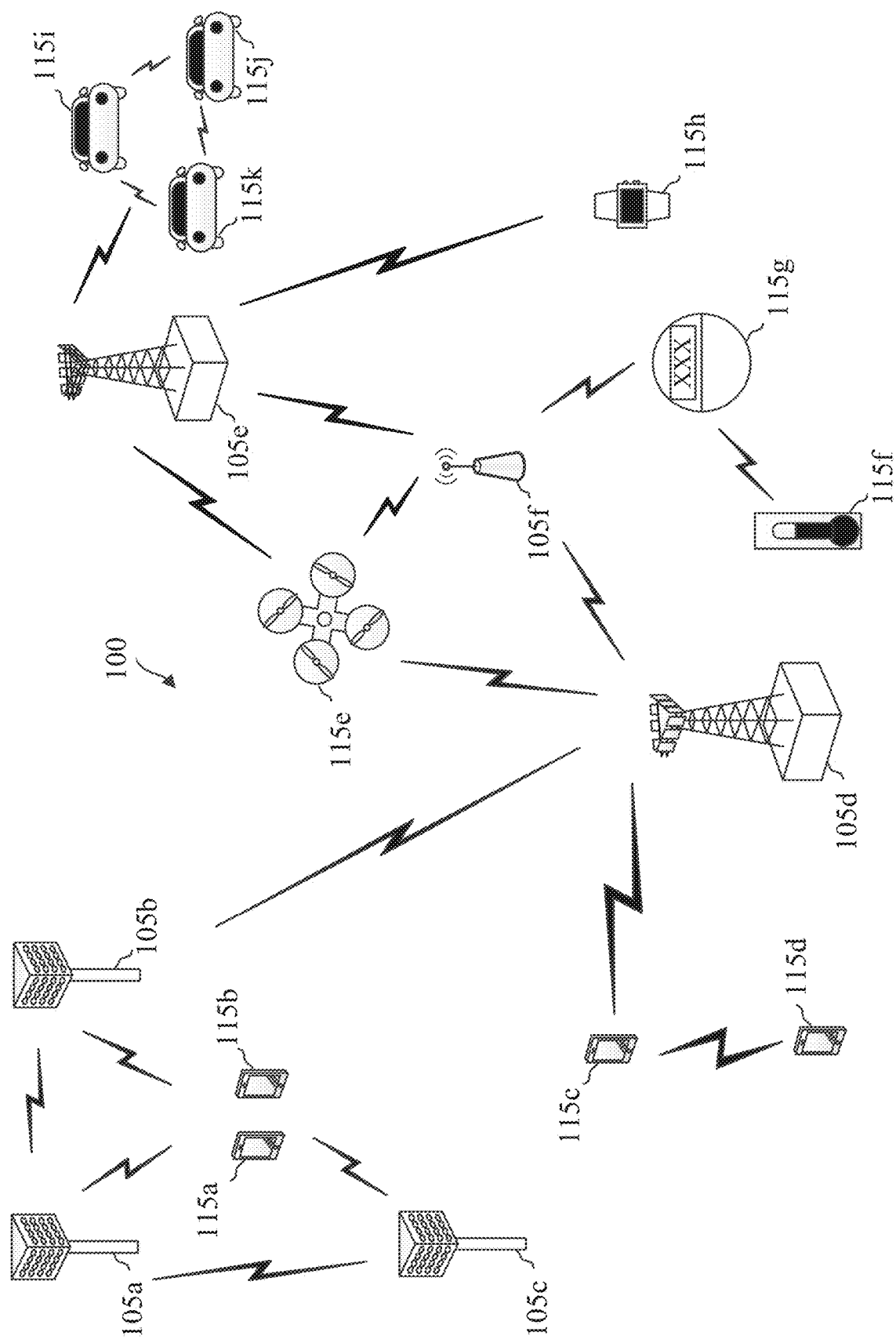
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. In some implementations, the SCI in the PSCCH may referred to as SCI part 1 or SCI stage-1 (SCI-1), and additional SCI, which may be referred to as SCI part 2 or SCI stage-2 (SCI-2) may be carried in the PSSCH. The SCI-2 can include control information (e.g., transmission parameters, modulation coding scheme (MCS)) that are more specific to the data carrier in the PSSCH. Use cases for sidelink communication may include V2X, enhanced mobile broadband (eMBB), industrial IoT (IIoT), and/or NR-lite.

In some cases, the term "sidelink UE" can refer to a user equipment device performing a device-to-device communication or other types of communications with another user equipment device independent of any tunneling through the BS (e.g., gNB) and/or an associated core network. A sidelink UE can be a "sidelink transmitting UE," which may refer to a user equipment device performing a sidelink transmission operation, or the sidelink UE can be a "sidelink receiving UE," which may refer to a user equipment device performing a sidelink reception operation (i.e., receiving transmission from a sidelink transmitting UE). A sidelink UE may operate as a transmitting sidelink UE at one time and operate as a receiving sidelink UE at another time.

In some cases, a sidelink UE can be a "COT-initiating UE" where the sidelink may initiate or acquire a channel occupancy time (COT) in a shared radio frequency band (e.g., in a shared spectrum or an unlicensed spectrum) for sidelink communication. For instance, the initiating UE may perform a clear channel assessment (CCA) or a category 4 (CAT4) listen-before-talk (LBT) in the shared radio frequency band to contend or acquire the COT. Upon passing the LBT (indicating the channel is clear for transmission), the initiating UE may transmit a sidelink transmission during the acquired COT, and a receiving UE may receive the sidelink transmission from the initiating UE. In some cases, a sidelink UE can be a "responding UE" where the sidelink UE responds to a sidelink transmission transmitted by any initiating UE. A sidelink UE may operate as an initiating UE at one time and operate as a responding UE at another time.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS (e.g., gNB) may determine a radio resource on behalf of a sidelink UE and transmit an indication of the radio resource to the sidelink UE. In some aspects, the serving BS grants a sidelink transmission with downlink control information (DCI). For this mode, however, there is significant base station involvement and may be operable when the sidelink UE is within the coverage area of the serving BS. The mode-2 RRA supports autonomous RRA that can be used for out-of-coverage sidelink UEs or partial-coverage sidelink UEs. For instance, a serving BS may configure a sidelink UE (e.g., while in coverage of the serving BS) with sidelink resource pools which may be used for sidelink when the sidelink UE is out of the coverage of the serving BS. A sidelink channel where two UEs may communicate with each other directly may also be referred to as a PC5 interface in 5G NR.

A sidelink communication can be in a unicast mode, a groupcast mode, or a broadcast mode. Additionally, hybrid automatic repeat request (HARQ) can be applied to a unicast or a groupcast sidelink communication to improve transmission reliability. For unicast communication, a sidelink transmitting UE may transmit a sidelink transmission including data to a single sidelink receiving UE and may request a HARQ acknowledgement/negative-acknowledgement (ACK/NACK) feedback from the sidelink receiving UE. If the sidelink receiving UE successfully decoded data from the sidelink transmission, the sidelink receiving UE transmits an ACK. Conversely, if the sidelink receiving UE fails to decode data from the sidelink transmission, the sidelink receiving UE transmits an NACK. Upon receiving a NACK, the sidelink transmitting UE may retransmit the data. For broadcast communication, a sidelink transmitting UE may transmit a sidelink transmission to a group of sidelink receiving UEs (e.g., 2, 3, 4, 5, 6 or more) in a neighborhood of the sidelink transmitting UE and may not request for an ACK/NACK feedback for the sidelink transmission.

A groupcast sidelink communication can be connection-based or connectionless. A connection-based groupcast sidelink communication is destined to a specific group of UEs, for example, each belongs to a group identified by a group identifier (ID), and known to the sidelink transmitting to the UE. As such, the sidelink transmitting UE may request an ACK/NACK feedback from each sidelink receiving UE in the group and may also assign each sidelink receiving UE in the group with a different feedback resource. For a connectionless groupcast sidelink communication, the group of UEs that can receive the groupcast transmission may be unknown to the sidelink transmitting UE. As such, the sidelink transmitting UE may request a NACK-only feedback from UEs that received the groupcast sidelink communication (successfully decoded the presence of the SCI), but fails to decode information data from the groupcast sidelink communication. In some instances, the sidelink transmitting UE may also assign the same NACK-only feedback resource to all UEs that failed the data decoding.

The provisioning of sidelink services, such as device-to-device (D2D), vehicle-to-vehicle (V2V), vehicle-to-everything (V2X), and/or cellular vehicle-to-everything (C-V2X) communications, over dedicated spectrum or licensed spectrum are relatively straight-forward as channel access in the dedicated spectrum or licensed spectrum is guaranteed. NR-unlicensed (NR-U) can bring benefit for sidelink services, for example, by offloading sidelink traffic to the unlicensed spectrum at no cost. However, channel access in a shared spectrum or an unlicensed spectrum is not guaranteed. Thus, to provision for sidelink services over a shared spectrum or unlicensed spectrum, sidelink user equipment devices (UEs) are required to contend for channel access in the spectrum, for example, via clear channel assessment (CCA) and/or listen-before-talk (LBT) procedures.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, a COT-initiating sidelink UE may contend for a COT in a shared radio frequency band by performing CCA or a CAT4 LBT. Upon passing the CCA or CAT4 LBT (indicating the channel is cleared for transmission), the sidelink UE may transmit a sidelink transmission to one or more sidelink receiving UEs during the COT. In some sidelink use cases (e.g., for V2X), sidelink data traffic may include small-sized or short data bursts (e.g., with a few bytes to tens of kilobytes of information data). In some aspects, the duration of a COT may be dependent on regulations imposed by a regulator of the shared radio frequency band or a certain deployment, which can be in the range from about 2 ms to about 10 ms (e.g., which may correspond to from about 4 slots to about 20 slots in NR CV2X with 30 kHz subcarrier spacing (SCS)). Thus, in some instances, the sidelink transmission with the small-sized data bursts may not occupy the entire duration of the COT. Accordingly, it may be desirable to share the remaining duration of the COT with the receiving or other UEs instead of leaving the remaining COT unused. In some instances, the COT-initiating UE may include COT-related information such as but not limited to the duration of the COT in its transmissions so that the receiving UEs can use the information to share/utilize the COT. For example, the initiating UE may transmit a PSCCH after initiating the COT and the SCI in the PSCCH may include the COT-related information. As another example, the initiating UE may transmit a PSCCH or a PSSCH after initiating the COT, and the SCI-1 in the PSCCH or the SCI-2 in the PSSCH, respectively, may include the COT-related information. In some cases, after receiving the SCI, SCI-1 or SCI-2, the receiving or other UEs may perform a CAT2 LBT or no LBT when the receiving or other UEs transmit during the COT initiated by the COT-initiating UE, which can be advantageous because CAT2 LBT or no LBT has less uncertainty in accessing the channel.

In some cases, it may be desirable for a COT-initiating UE to reserve at least a portion of the acquired COT for future use. However, in wireless communication systems that operate in accordance to Releases 16 of the "3rd Generation Partnership Project" (3GPP), for example, sidelink reservation (e.g., for V2X use case) may occur slot-by-slot. That is, in use cases such as 3GPP Release 16 V2X, sidelink reservation may be performed slot-by-slot (e.g., reservation of up to two future sidelink slots). Such slot-by-slot reservations, however, may not be suitable or efficient for other sidelink use cases, such as eMBB. For example, eMBB use cases may include transmission and retransmission of eMBB traffic, and slot-by-slot reservation of sidelink slots may be inefficient or unfit for handling such traffic. In such cases, instead of or in addition to slot-by-slot sidelink reservation, the reservation of a COT, or a portion thereof, by a COT-initiating UE may allow the initiating UE to efficiently handle use cases such as eMBB. In such cases, there may be a need for mechanisms that allow the COT-initiating UE to provide COT-reservation information to the receiving UEs, such information including the resources (e.g., time/frequency) of the reserved COT so that the receiving UEs may share/utilize the portion(s) of the COT that are not reserved by the COT-initiating UE.

Some aspects of the present disclosure disclose methods, systems and apparatus directed to the transmission of channel occupancy time-sharing information (COT-SI) carrying reservation information of a COT that is reserved for sidelink communications in unlicensed bands. In some aspects, the COT-SI including the COT-reservation information (i.e., reserving the COT for the COT-initiating UE) may be carried by a SCI-1 that is transmitted to the receiving UEs via a PSCCH. In some aspects, the COT-SI may be carried by a SCI-2 that is transmitted via a PSSCH. That is, the COT-SI may be carried by legacy SCI-1 and/or SCI-2 messages. In some aspects, the COT-SI may be transmitted via PSCCH, which may be a multi-subchannel PSCCH or a single-subchannel PSCCH. In some aspects, the COT-SI may be transmitted via a dedicated physical sidelink channel, which may be embedded in a PSSCH. In some aspects, the COT-SI may be transmitted via a gap symbol or an automatic gain control (AGC) symbol of the sidelink channel.

Aspects of the present disclosure can provide several benefits. For example, aspects that allow a COT-initiating UE to reserve a future COT in a sidelink channel (e.g., by including COT-reservation information in a COT-SI transmitted via any of the above-identified sidelink transmissions) facilitate the handling of data traffic by the COT-initiating UE of use cases that may not be served efficiently by slot-by-slot sidelink reservations. For instance, the COT-initiating UE may reserve a future COT for a future retransmission of eMBB data. Further, sidelink COT sharing in unlicensed bands is improved because UEs receiving the COT-SI can access portions of COTs that are not reserved by the COT-initiating UE and may otherwise go unused.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 decodes the DL data packet successfully, the UE 115 may transmit a HARQ acknowledgement (ACK) to the BS 105. Conversely, if the UE 115 fails to decode the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel. A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. Conversely, the LBT results in a failure when a channel reservation signal is detected in the channel. A TXOP may also be referred to as channel occupancy time (COT).

In some aspects, the network 100 may provision for sidelink communications to allow a UE 115 to communicate with another UE 115 without tunneling through a BS 105 and/or the core network. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. In some examples, a transmitting sidelink UE 115 may indicate SCI in two stages. In a first-stage SCI (which may be referred to as SCI-1), the UE 115 may transmit SCI in PSCCH carrying information for resource allocation and decoding a second-stage SCI. The first-stage SCI may include at least one of a priority, PSSCH resource assignment, resource reservation period (if enabled), PSSCH DMRS pattern (if more than one pattern is configured), a second-stage SCI format (e.g., size of second-stage SCI), an amount of resources for the second-stage SCI, a number of PSSCH demodulation reference signal (DMRS) port(s), a modulation and coding scheme (MCS), etc. In a second-stage SCI (which may be referred to as SCI-2), the UE 115 may transmit SCI in PSSCH carrying information for decoding the PSSCH. The second-stage SCI may include an 8-bit L1 destination identifier (ID), an 8-bit L1 source ID, a HARQ process ID, a new data indicator (NDI), a redundancy version (RV), etc. It should be understood that these are examples, and the first-stage SCI and/or the second-stage SCI may include or indicate additional or different information than those examples provided. Sidelink communication can also be communicated over a physical sidelink feedback control channel (PSFCH), which indicates an acknowledgement(ACK)-negative acknowledgement (NACK) for a previously transmitted PSSCH.

In some aspects, a sidelink communication can be in a unicast mode, a groupcast mode, or a broadcast mode, where HARQ may be applied to unicast and/or groupcast communications. For unicast communication, a sidelink transmitting UE 115 may transmit a sidelink transmission including data to a single sidelink receiving UE 115 and may request a HARQ acknowledgement/negative-acknowledgement (ACK/NACK) feedback from the sidelink receiving UE 115. If the sidelink receiving UE 115 successfully decoded data from the sidelink transmission, the sidelink receiving UE 115 transmits an ACK. Conversely, if the sidelink receiving UE 115 fails to decode data from the sidelink transmission, the sidelink receiving UE 115 transmits an NACK. Upon receiving a NACK, the sidelink transmitting UE 115 may retransmit the data. For broadcast communication, a sidelink transmitting UE 115 may transmit a sidelink transmission to a group of sidelink receiving UEs 115 (e.g., 2, 3, 4, 5, 6 or more) in a neighborhood of the sidelink transmitting UE 115 and may not request for an ACK/NACK feedback for the sidelink transmission.

For groupcast communication, a sidelink transmitting UE 115 may transmit a sidelink transmission to a group of sidelink receiving UEs 115 (e.g., 2, 3, 4, 5, 6 or more). Groupcast communication may have a wide variety of use cases in sidelink. As an example, groupcast communication can be used in a V2X use case (e.g., vehicle platooning) to instruct a group of vehicles nearby an intersection or traffic light to stop at the intersection. In some aspects, a groupcast communication can be connection-based, where the group of the sidelink receiving UEs 115 may be preconfigured as a group identified by a group identifier (ID). As such, the sidelink receiving UEs 115 in the group are known to the sidelink transmitting UE 115, and thus the sidelink transmitting UE 115 may request an ACK/NACK feedback from each sidelink receiving UE 115 in the group. In some instances, the sidelink transmitting UE 115 may provide each sidelink receiving UE with a different resource (e.g., an orthogonal resource) for transmitting an ACK/NACK feedback. In some other aspects, a groupcast communication can be connectionless, where the group of sidelink receiving UEs 115 that can receive the groupcast transmission may be unknown to the sidelink transmitting UE 115. In some instances, the group of sidelink receiving UEs 115 may receive the groupcast communication based on a zone or geographical location of the receiving UEs 115. Since the sidelink transmitting UE 115 may not have knowledge of the receiving sidelink UEs 115, the sidelink transmitting UE 115 may request an NACK-only feedback from the sidelink receiving UEs 115, referred to as a groupcast option-1 transmission. For instance, a sidelink receiving UE 115 may transmit an NACK if the sidelink receiving UE detected the presence of SCI, but fails to decode data (transport block) from the sidelink transmission. The sidelink receiving UE 115 may not transmit an ACK if the data decoding is successful. Groupcast option-2 transmission refers to the scenario where a sidelink receiving UE transmits an ACK if the data decoding is successful and transmits an NACK if the decoding fsils. In some instances, the sidelink receiving UEs 115 may be assigned with the same resource for transmitting an NACK feedback. The simultaneous NACK transmission from multiple sidelink receiving UEs 115 in the same resource may form a single frequency network (SFN) transmission (where waveforms of the multiple NACK transmissions are combined) at the sidelink transmitting UE 115. Similar to the unicast communication, the sidelink transmitting UE 115 may retransmit sidelink data upon receiving an NACK for a connection-based or connectionless groupcast transmission.

Figure 2:
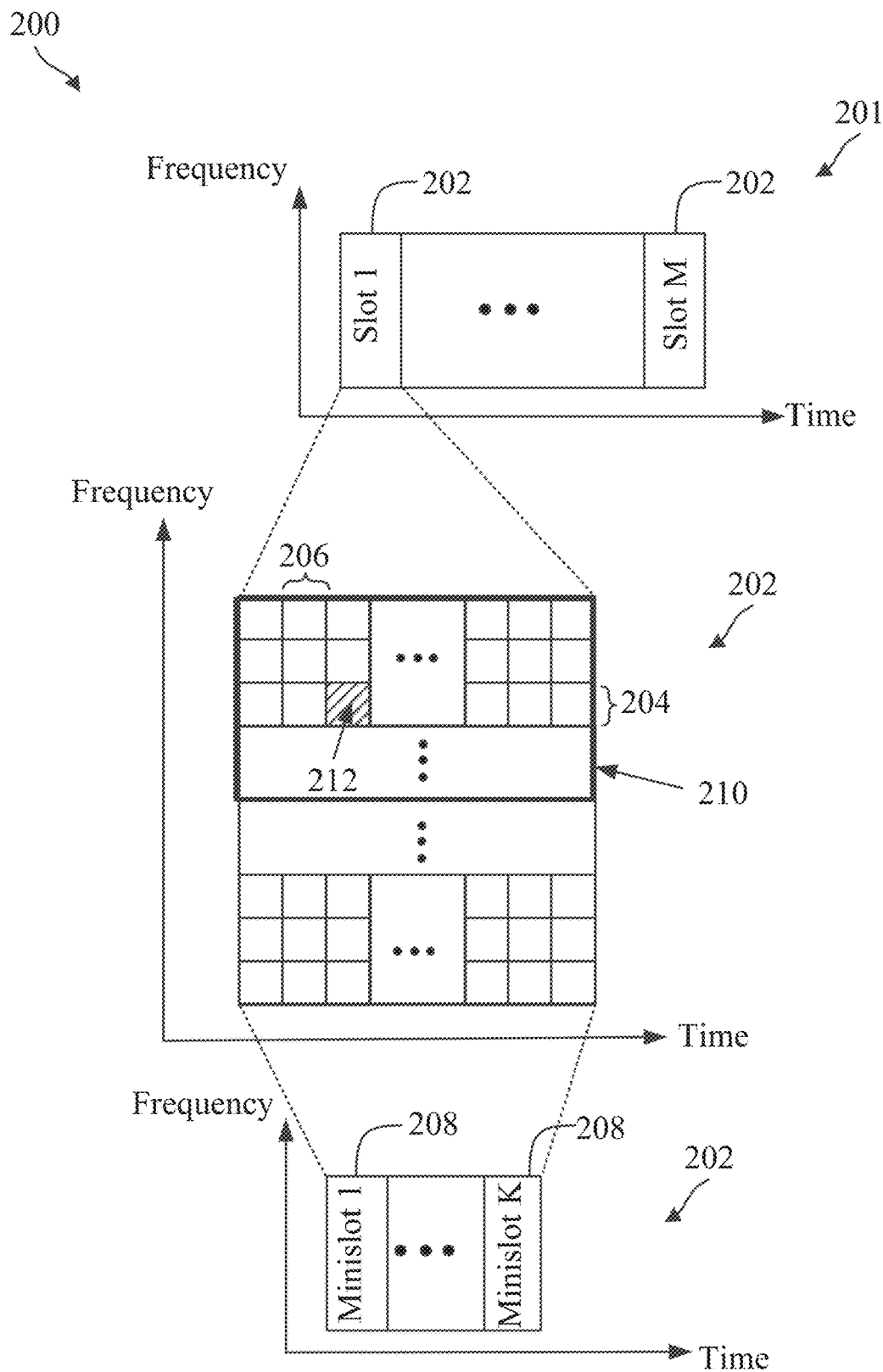
FIG. 2 is a timing diagram illustrating a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In some aspects, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204 in 1 symbol, 2 symbols, . . . , 14 symbols). In some aspects, a UE (e.g., UE 115i of FIG. 1) may communicate sidelink with another UE (e.g., UE 115j of FIG. 1) in units of time slots similar to the slot 202.

Figure 3:
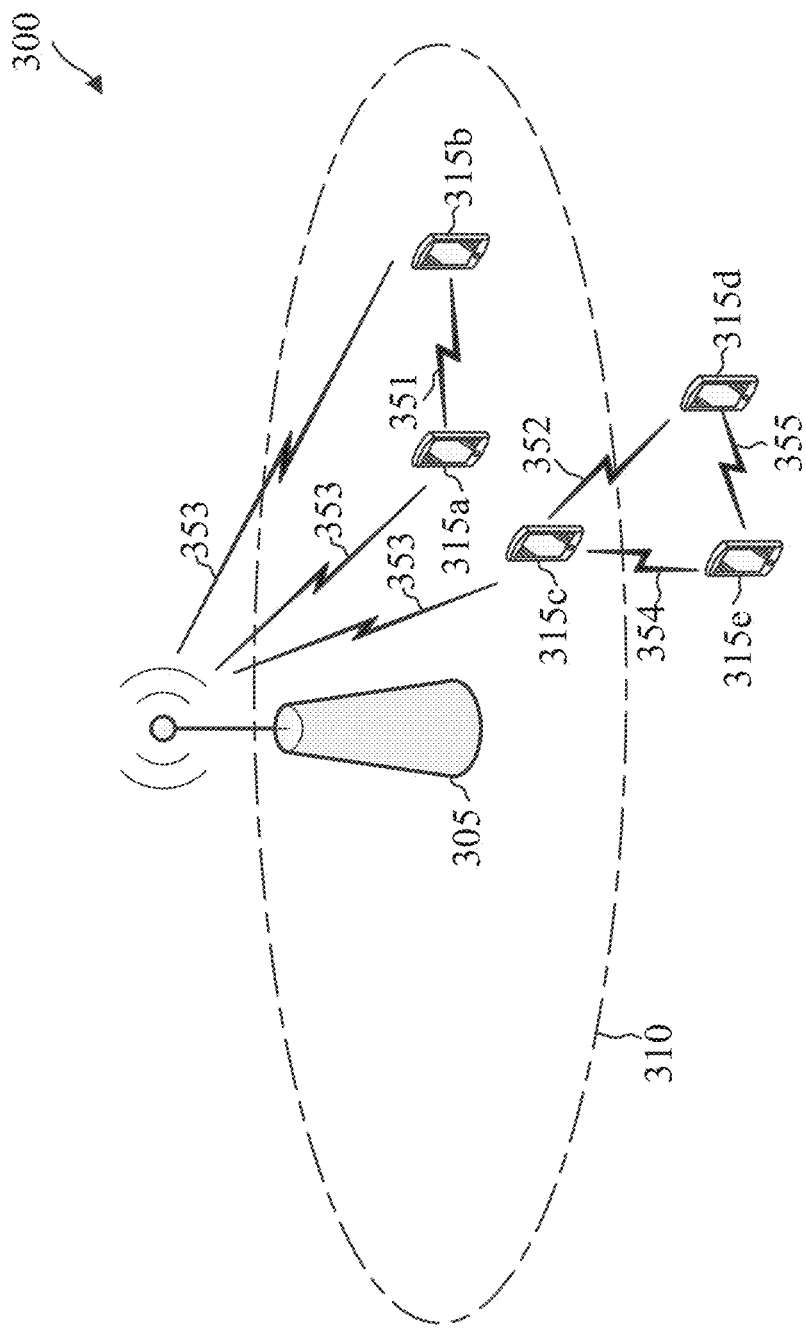
FIG. 3 illustrates a wireless communication network that provisions for sidelink communications according to some aspects of the present disclosure.

FIG. 3 illustrates an example of a wireless communication network 300 that provisions for sidelink communications according to aspects of the present disclosure. The network 300 may correspond to a portion of the network 100 may utilize the radio frame structure 200 for communications. FIG. 3 illustrates one BS 305 and five UEs 315 (shown as 315a, 315b, 315c, 315d, and 315e) for purposes of simplicity of discussion, though it will be recognized that aspects of the present disclosure may scale to any suitable number of UEs 315 (e.g., the about 2, 3, 4, 6, 7 or more) and/or BSs 305 (e.g., the about 2, 3 or more). The BS 305 and the UEs 315 may be similar to the BSs 105 and the UEs 115, respectively. The BS 305 and the UEs 315 may share the same radio frequency band for communications. In some instances, the radio frequency band may be a licensed band. In some instances, the radio frequency band may be an unlicensed band. In some instances, the radio frequency band may be a frequency range 1 (FR1) band. In some instances, the radio frequency band may be a FR2 band. In general, the radio frequency band may be at any suitable frequency.

In the network 300, some of the UEs 315 may communicate with each other in peer-to-peer communications. For example, the UE 315a may communicate with the UE 315b over a sidelink 351, the UE 315c may communicate with the UE 315d over a sidelink 352 and/or with the UE 315e over a sidelink 354, and the UE 315d may communicate with the UE 315e over a sidelink 355. The sidelinks 351, 352, 354, and 355 are unicast bidirectional links. In some aspects, the UE 315c may also communicate with the UE 315d and the UE 315e in a groupcast mode. Similarly, the UE 315d may also communicate with the UE 315c and the UE 315e in a groupcast mode. In general, the UEs 315c, 315d, an 315e may communicate with each other in a unicast mode or a groupcast mode.

Some of the UEs 315 may also communicate with the BS 305 in a UL direction and/or a DL direction via communication links 353. For instance, the UE 315a, 315b, and 315c are within a coverage area 310 of the BS 305, and thus may be in communication with the BS 305. The UE 315d and UE 315e are outside the coverage area 310, and thus may not be in direct communication with the BS 305. In some instances, the UE 315c may operate as a relay for the UE 315d to reach the BS 305. In some aspects, some of the UEs 315 are associated with vehicles (e.g., similar to the UEs 115i-k) and the communications over the sidelinks 351 and/or 352 may be C-V2X communications. C-V2X communications may refer to communications between vehicles and any other wireless communication devices in a cellular network.

FIGS. 4-8 show example diagrams illustrating radio frame resources for transmitting channel occupancy time-sharing information (COT-SI) carrying COT reservation information according to some aspects of the present disclosure. As discussed above, in some aspects, a UE may perform a channel access procedure to acquire one or more COTs in a sidelink channel over an unlicensed new radio (NR-U) band. For example, the COT-initiating UE may perform a CAT4 LBT in the unlicensed frequency band to contend or acquire the one or more COTs. In some instances, the UE may reserve the one or more COTs, or portions thereof, for future use by transmitting the reservation information to other UEs, so that the other UEs can share the one or more COTs without interfering with the COT-initiating UE's use of the reserved one or more COTs. In some aspects, the COT-reservation information may be transmitted via a COT-St.

Figure 4:
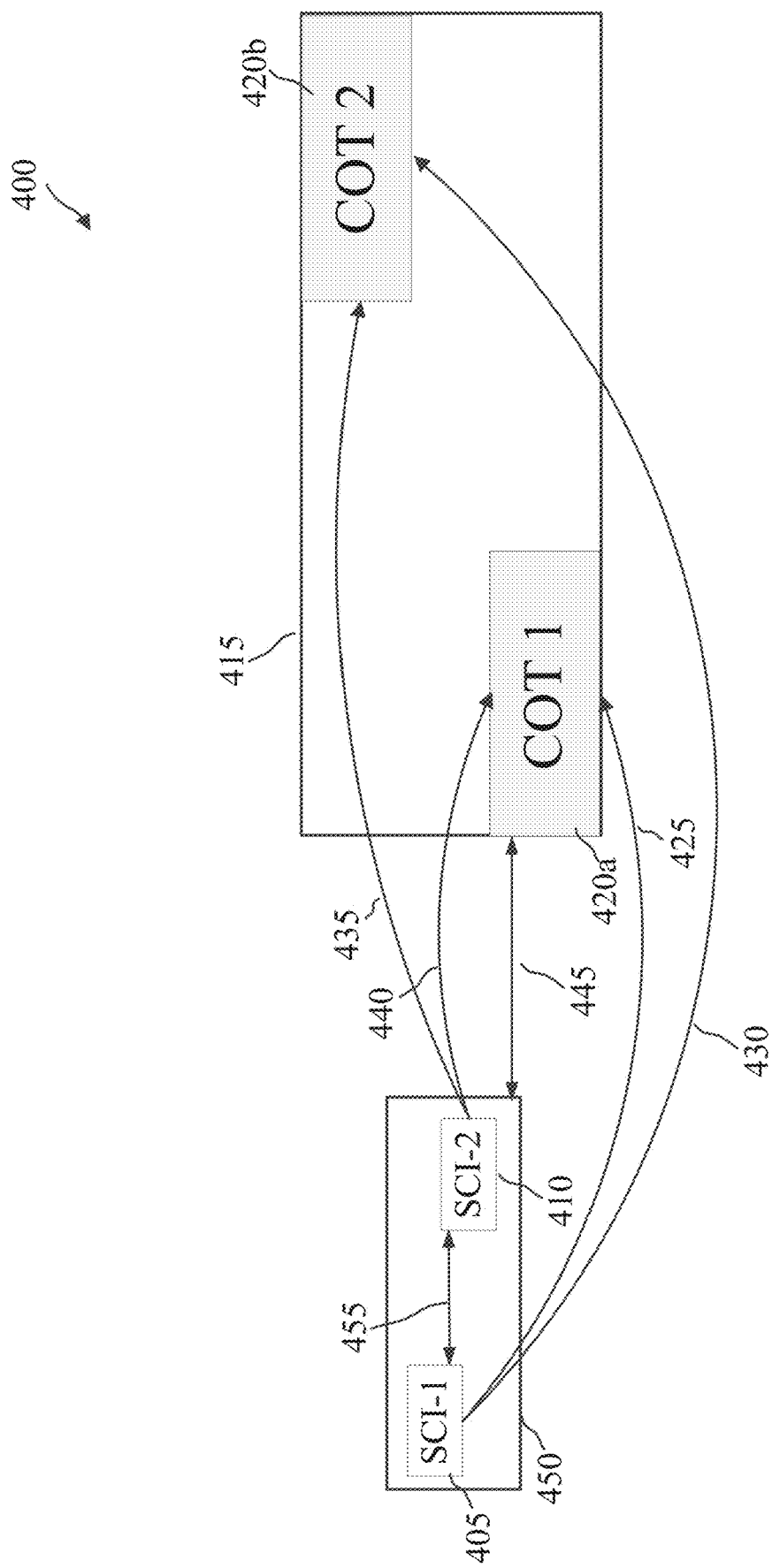
FIGS. 4-8 show example diagrams illustrating radio frame resources for transmitting channel occupancy time-sharing information (COT-SI) carrying COT reservation information according to some aspects of the present disclosure.

FIG. 4 shows an example illustration 400 of the reservation of one or more COTs 420a, 420b by a COT-initiating UE that is configured to reserve the one or more COTs 420a, 420b by transmitting, to other UEs (e.g., sidelink transmission receiving UEs) seeking to share the one or more COTs 420a, 420b, a COT-SI via a SCI-1 405 and/or a SCI-2 410, according to some aspects of the present disclosure. In some instances, a UE using a first COT 450 may acquire a second COT 415 that includes the one or more COTs 420a, 420b. In some cases, the UE may not need to use the entire second COT 415 and may reserve a portion or portions of the second COT 415, for instance, the one or more COTs 420a, 420b, so that the other UEs capable of accessing the second COT 415 can share and utilize the rest of the second COT 415. In some instances, the terms "receiving UEs" and the "other UEs" may refer to UEs that are configured to receive the COT reservation information from the COT-initiating UE and access the COT acquired by the COT-initiating UE based on the COT reservation information (e.g., access portions of the COT not reserved by the COT-initiating UE).

In some aspects, the COT-SI including the COT-reservation information reserving the one or more COTs 420a, 420b for future use may be carried by a SCI-1 that is configured to be transmitted to the other UEs via a PSCCH. That is, a SCI-1 405 may carry the COT-SI that is configured to reserve 425 the COT 1 420a and/or reserve 430 the COT 2 420b. As discussed above, SCI-1 are stage-1 SCI transmitted via a PSCCH carrying reservation and/or scheduling information for sidelink data transmission in an associated PSSCH carrying the SCI-2 410. Examples of said reservation and/or scheduling information include frequency and time locations in the data channel of the sidelink data transmission (i.e., PSSCH transmission) scheduled by the SCI-1 405, which may be indicated by a frequency domain resource allocation (FDRA) field and a time domain resource allocation (TDRA) field in the SCI-1 405, respectively. In some aspects, the COT-SI may be included in the SCI-1 405 by piggybacking the COT-SI on the legacy FDRA field and/or TDRA field. For example, a legacy SCI-1 405 may be configured to reserve up to a maximum of N PSSCH transmissions (e.g., N=2, 3, etc.).

For instance, the legacy SCI-1 may include TDRA field and/or FDRA field indicating up to a maximum of N sidelink data transmissions (i.e., PSSCH transmissions). In such cases, to piggyback the COT-SI into a legacy SCI-1, the TDRA field and/or the FDRA field of a SCI-1 405 carrying or including a COT-SI may be configured such that the TDRA field and/or the FDRA field indicate X1 PSSCH transmissions and N−X1 COT reservations. In other words, the reservation 425 of COT 1 420a and/or the reservation 430 of COT 2 420b may be accomplished by a SCI-1 405 by including the COT-SI piggybacking legacy TDRA field and/or FDRA field indicating N−X1 COT reservations. For instance, N can be equal to 3, and the SCI-1 405 may reserve/schedule X1=1 PSSCH reservation. In such cases, the SCI-1 405 may include a COT-SI to reserve N−X1=2 COTs (e.g., COT 1 420a and COT 2 420b), which can be accomplished by TDRA field and/or FDRA field indicating reservation of X1=1 sidelink data/PSSCH transmission and N−X1=2 COT reservations. In some instances, the receiving UEs receiving the SCI-1 405 may be configured to decode the SCI-1/COT-SI to determine/understand that the legacy TDRA field and/or FDRA field in the SCI-1 405 indicating N−X1 COT reservations in fact are configured to reserve N−X1 COT reservations in the COT 415.

In some aspects, X1, the number of PSSCH reservations, and/or N−X1, the number of COT-reservations, may be semi-statically configured (e.g., RRC configured by an RRC message from a base station to which the COT-initiating UE is connected). In some aspects, the configuration of X1 and/or N−X1 may be dynamic. For instance, the configuration may be via cyclic redundancy check (CRC) scrambling sequence or via explicit SCI indication (e.g., from the base station). With respect to the X1 PSSCH reservations, in some instances, the SCI-1 405 may include information related to the time-frequency slot/subchannel structure associated with the reserved PSSCH sidelink data transmission(s). For example, the SCI-1 405, as noted above, may include reservation and/or scheduling information about the PSSCH carrying the SCI-2 410, examples of said reservation and/or scheduling information including the offset slot 455 between the PSCCH carrying the SCI-1 405 and the PSSCH carrying the SCI-2 410, the starting subchannel and width of the PSSCH sidelink data transmission, etc. For instance, the SCI-1 may include the parameters offset representing the offset slot 455, startingsubchannel identifying the starting subchannel of the PSSCH transmission, and PSSCHWidth representing the width of the PSSCH transmission. In some cases, the offset slot 455 and the starting subchannel can be for each PSSCH reservation of the X1 PSSCH reservations, while the width of the PSSCH can be common for all the X1 PSSCH reservations.

In some aspects, for the N−X1 COT reservations, these legacy parameters (e.g., offset, startingsubchannel, PSSCHWidth, etc.) of the SCI-1 may be repurposed or re-interpreted to better represent the time frequency structure associated with the COT. That is, the SCI-1 405 carrying the COT-SI may include these repurposed parameters to provide reservation information about the N−X1 COTs (e.g., such as COT 1 420a and COT 2 420b). For example, the COT-SI carried by the SCI-1 405 may include a repurposed offset parameter that indicates the offset 445 or separation between the end of the current COT 450 which the COT-initiating UE is using and the reserved COTs (e.g., as opposed to the legacy offset parameter that represents the separation between the PSSCH carrying the SCI-1 and the PSSCH carrying the SCI-2). In such cases, the offset 445 may be in units of multiple slots time span. As another example, the PSSCHWidth and the startingsubchannel parameters may be repurposed to identify the width and starting locations of the reserved COTs (e.g., in units of LBT subband/RB set) (e.g., in contrast to the respective legacy parameters which may be expressed in units of subchannels).

In some aspects, instead of or in addition to repurposing legacy SCI-1 parameters to include COT-SI reserving the COTs, the SCI-1 405 may include new fields/bits that are dedicated or directed to expressing the COT-reservation information. For example, these new fields/bits may encode the COT-SI, such as the offset 445 from the end of the current COT 450 to the reserved COTs (e.g., such as COT 1 420a), the width and/or the starting location of the reserved COTs, the number of reserved COTs, the time duration of the reserved COTs (e.g., in units of number of slots or time (e.g., ms)), the types of the reserved COTs (e.g., whether the COTs are periodic or one-shot), if periodic, the periodicity of the reserved COTs, and/or the like.

In some aspects, instead of or in addition to the SCI-1 405 including the COT-SI reserving the one or more COTs 420a, 420b, the SCI-2 410, which is carried by the PSSCH sidelink transmission that is scheduled by the SCI-1 405, may include the COT-SI. In some instances, the SCI-2 410 may be a legacy stage-2 SCI including control information (e.g., transmission parameters, modulation coding scheme (MCS), etc.) that are more specific to the data carrier in the PSSCH as well as the COT-SI. That is, in some cases, the SCI-2 410 may include COT-reservation information (e.g., COT-SI) as well as control information related to the PSSCH sidelink transmission that carries the SCI-2 itself. For example, in some cases, all SCI-2 formats may be configured to include COT-SI, i.e., COT-reservation information.

In some aspects, the SCI-2 410 may not be a legacy stage-2 SCI but rather may have a different/new format that is dedicated to COT-SI. For instance, the SCI-2 410 with a format dedicated to COT-SI may include codepoint for COT information (e.g., bitmap for RB set and COT duration) related to the current COT 405 that the COT-initiating UE is using, the future COT 415, reserved COTs 420a, 420b, etc. That is, the different/new SCI-2 format that is dedicated to COT-SI may be a newly defined SCI-2 format that is different from the current four SCI-2 formats that are specified in 3GPP specification where the format is indicated by two bits in SCI-1. Fore example, a new SCI-2 format may have payload size that is different from those of the aforementioned current SCI-2 formats (e.g., and the interpretation thereof may also be newly introduced and provided). In some instances, the new fields/bits of the dedicated SCI-2 format may encode the COT-SI, such as the offset 445 from the end of the current COT 450 to the reserved COTs (e.g., such as COT 1 420a), the width and/or the starting location of the reserved COTs, the number of reserved COTs, the time duration of the reserved COTs (e.g., in units of number of slots or time (e.g., ms)), the types of the reserved COTs (e.g., whether the COTs are periodic or one-shot), if periodic, the periodicity of the reserved COTs, and/or the like.

Figure 5:
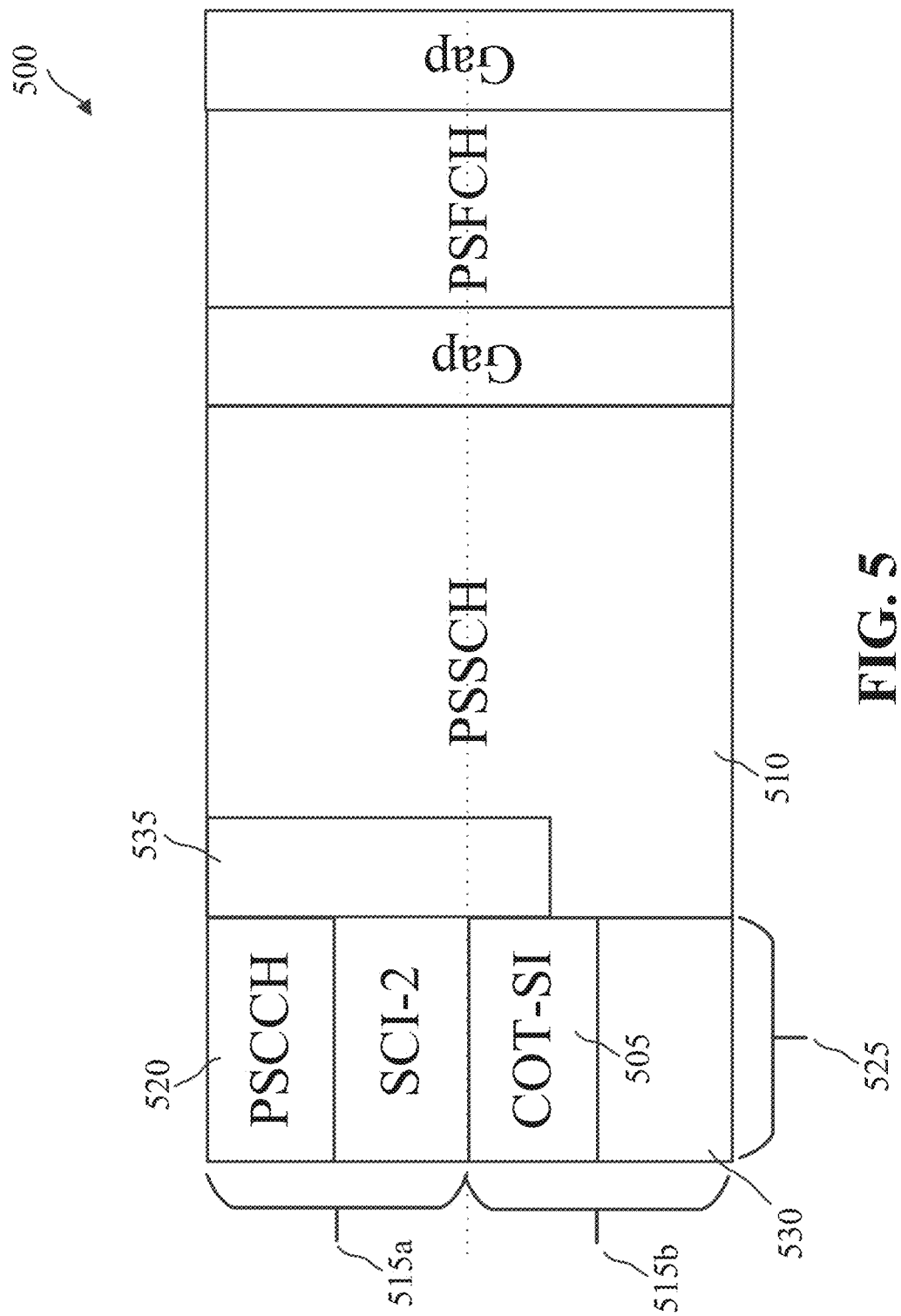

FIG. 5 shows an example frequency-time (FT) radio frame structure 500 configured for transmitting a COT-SI according to some aspects of the present disclosure. In some aspects, a UE that has acquired one or more COTs may be reserving at least a portion of the one or more COTs for future use, and the UE may transmit the COT-reservation information (e.g., a COT-SI) via a PSCCH resource 505 of a TF radio frame structure 500 that has a PSSCH resource 510 configured for a multi-subchannel PSSCH transmission. In some instances, the PSSCH resource 510 may transmit sidelink data over multiple subchannels 515a, 515b, while the PSCCH transmission in the PSCCH resource 520 that is associated with the sidelink data transmission may be transmitted over a single (e.g., the lower) subchannel 515a of the multi-subchannel radio frame 500. That is, when a sidelink data transmission is transmitted over a multi-subchannel PSSCH resource 510, because the corresponding PSCCH transmission associated with such PSSCH transmission may be transmitted via a PSCCH resource 520 that is located in a single subchannel 515a, the resources in the other subchannels 515b having the same symbols 525 as those of the PSCCH resource 520 may be available, and can be used by the UE, for transmitting COT-SI. For example, said resources in the other subchannels 515b can be PSCCH resources 505 that may be configured for transmitting the COT-SI.

A non-limiting illustrative example is shown in FIG. 5 where a PSCCH carried via a PSCCH resource 520 in a single subchannel 515a is associated with a PSSCH carried via a PSSCH resource 510 that occupies two subchannels 515a, 515b, i.e., the PSSCH resource can be a two-subchannel PSSCH resource 510. For example, a SCI-1 of the PSCCH carried by the PSCCH resource 520 may reserve a two-subchannel resource 510 for the transmission of the PSSCH/sidelink data. In some cases, the resources having the same symbols 525 as those of the PSCCH resource 520 but located in the other subchannel 515b of the two subchannels 515a, 515b may be configured for transmitting the COT-SI. For example, the resources having the symbols 525 in the subchannel 515b (e.g., resource 505) may be configured for PSCCH transmissions and can be used to transmit the COT-SI. This is in contrast to the standards articulated in the specification of 3GPP Release 16, where the resources are configured for PSSCH transmissions only. It is to be noted that although FIG. 5 shows two subchannels 515a, 515b, the radio frame 500 can include any number of multiple subchannels (e.g., 3, 4, 5, etc., subchannels). In such cases, a PSCCH transmission may be carried via a PSCCH resource in a single subchannel (e.g., PSCCH transmission via the PSCCH resource 520) and the COT-SI may be transmitted via a resource configured for PSCCH transmission and located in any one of the other multiple subchannels. In some instances, the COT-SI may be transmitted to reserve one or more future COTs in the radio frame 500.

In some aspects, the COT-SI transmitted via the PSCCH resource 505 of the radio frame 500 may re-use a SCI-1 waveform. That is, the COT-SI may have same waveform as that of a SCI-1 message. In some aspects, the COT-SI may also have the same payload as that of a SCI-1 message. In some aspects, the receiving UEs (e.g., the UEs receiving the COT-SI) may blindly decode all transmissions transmitted via the PSCCH resources of the radio frame 500. That is, the receiving UEs may, for instance, decode transmissions from PSCCH resources across all the subchannels 515a, 515b of the radio frame 500 (e.g., without skipping any subchannel/PSCCH resource). As such, the receiving UEs may be able to decode the COT-SI that is transmitted via a PSCCH resource of one of the multiple subchannels of the radio frame 500 (e.g., PSCCH resource 505 of the subchannels 515a, 515b). In some cases, the receiving UEs may decode the COT-SI in a manner similar to decoding a SCI-1 message.

As noted above, the PSCCH transmission that is associated with the sidelink data transmission in the multi-subchannel PSSCH resource 510 may be transmitted via a PSCCH resource (e.g., such as PSCCH resource 520) that is located within a single subchannel only (e.g., subchannel 515a). In such cases, the resources in any of the other subchannels of the multiple subchannels sharing the same symbols as those of PSCCH resource (e.g., PSCCH resource 505 in subchannel 515b) may be configured for PSCCH transmissions and may be used to transmit the COT-SI. In some instances, the PSSCH transmission via the PSCCH resource 520 may include a SCI-1, which may be considered as the primary SCI-1, and such SCI-1 may include information related to the COT-SI. For example, the primary SCI-1 may include information indicating the presence of the COT-SI in the PSCCH resources of any of the other subchannels (e.g., the presence of COT-SI in the PSCCH resource 505 of subchannel 515*b*). As another example, the SCI-1 may include information about the location of the COT-SI (e.g., information identifying the location of the PSCCH resource carrying the COT-SI).

In some aspects, SCI-2 rate matching may skip the resources of the radio frame 500 used for PSCCH and COT-SI transmissions. In some aspects, SCI-2 rate matching shall skip the resources of the radio frame 500 used for PSCCH and COT-SI transmissions. For example, the SCI-2 rate matching may or shall skip the PSCCH resource 505, but may not skip, for instance, the resources 530, 535 that are not used by PSCCH or COT-SI. In some instances, the SCI-1 carried by the PSCCH transmission (e.g., SCI-1 carried by the transmission in the PSCCH resource 520) may indicate the special rate-matching for the SCI-2. In some cases, the special rate-matching for the SCI-2 can be to indicate the existence of the COT-SI.

Figure 6:
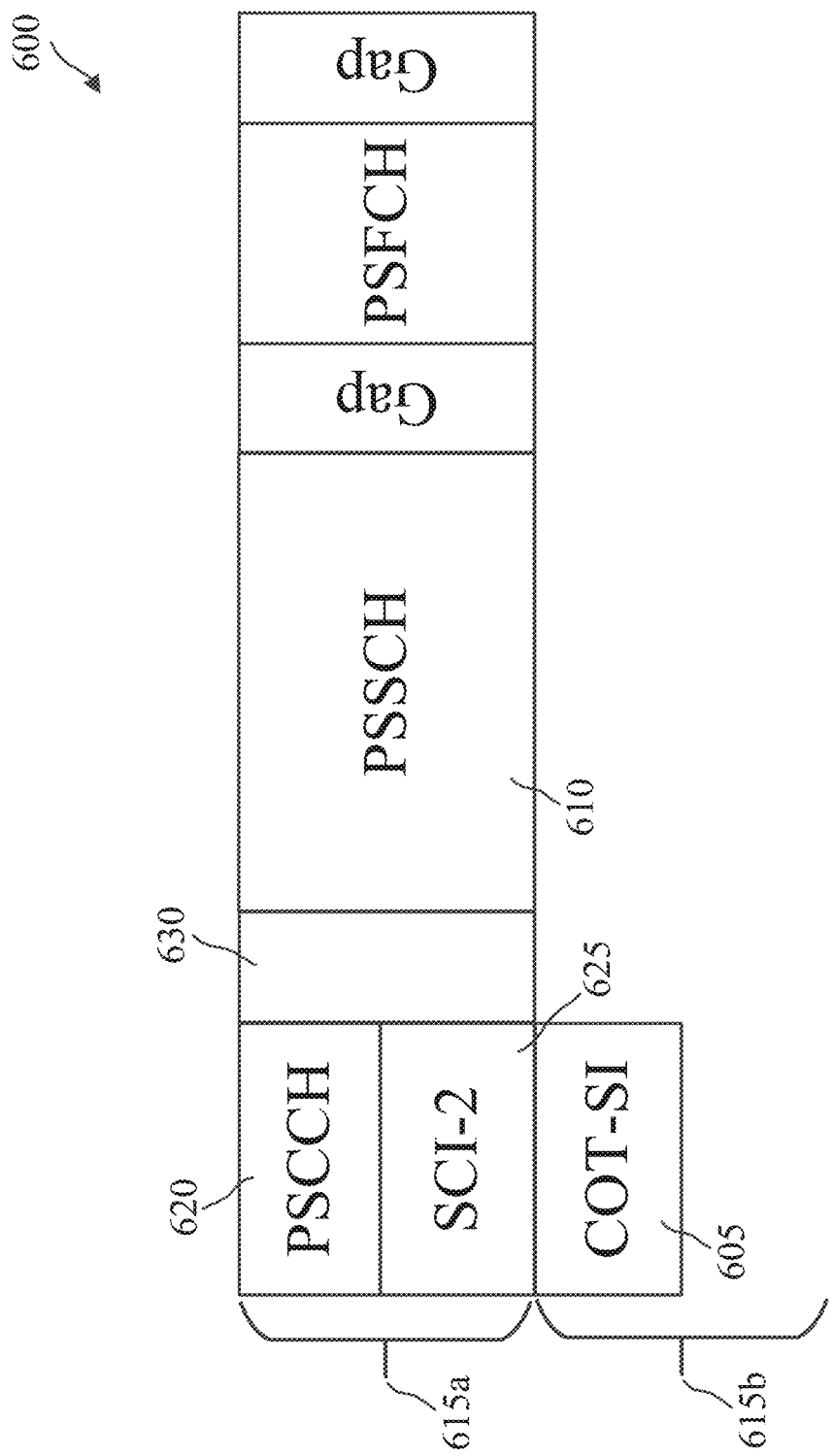
Figure 7:
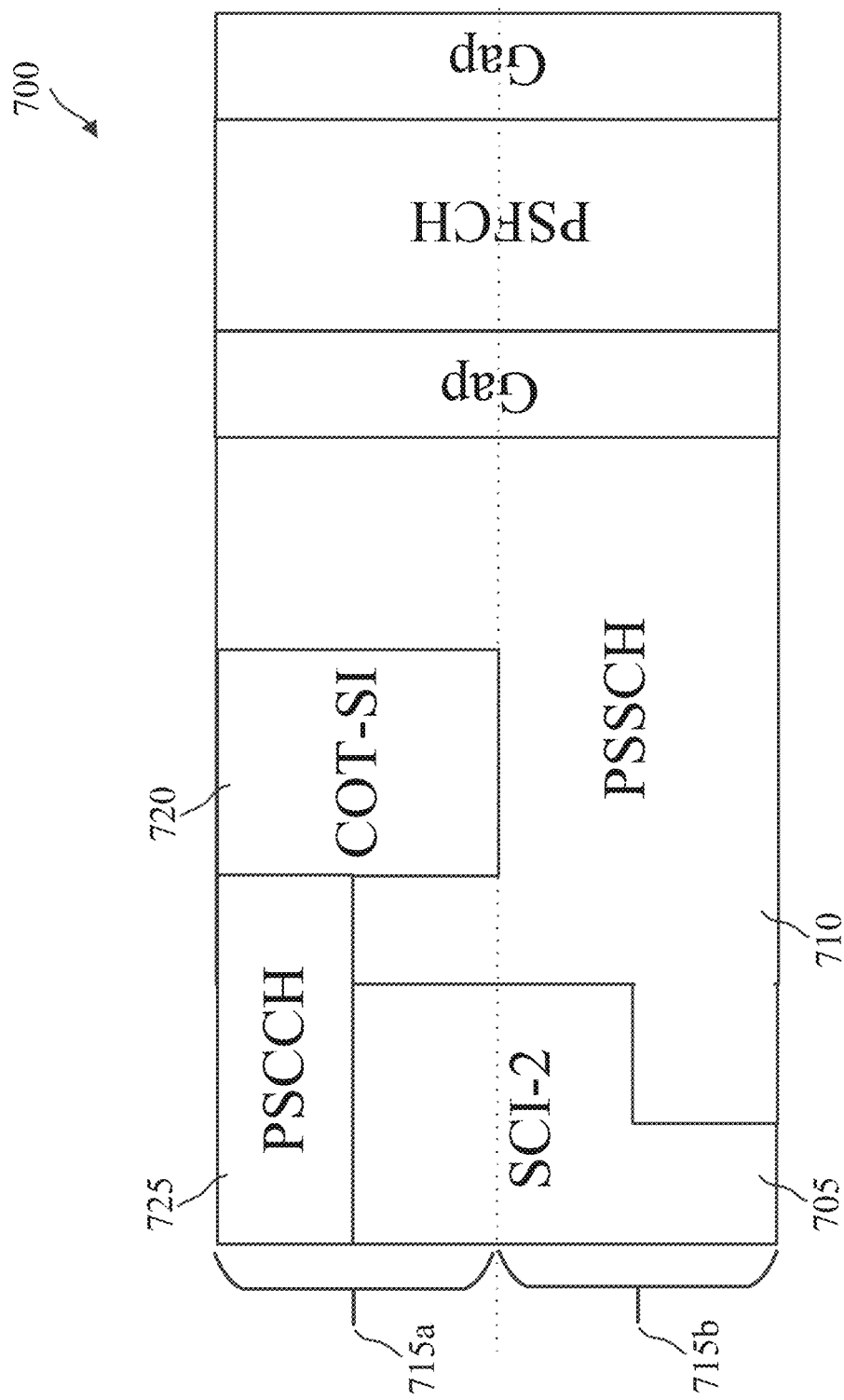
Figure 8:
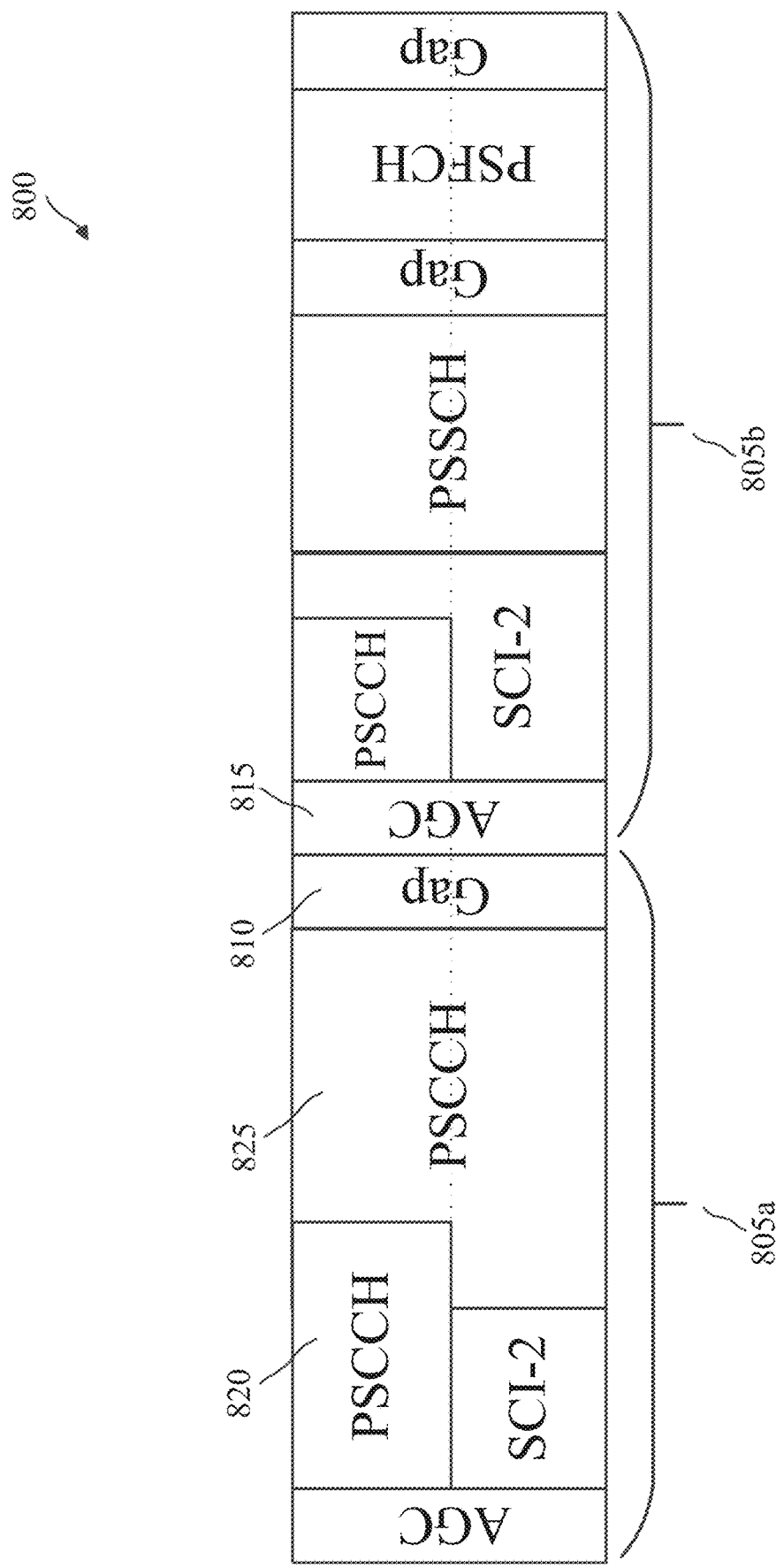

In some aspects, the PSSCH resource configured for transmitting sidelink data may be a single subchannel PSSCH resource, as shown in the example frequency-time (FT) radio frame structure 600 of FIG. 6. In some instances, the PSSCH resource 610 that is configured to transmit the sidelink data transmission (e.g., PSSCH transmission) and the PSCCH resource 620 that is configured to transmit the associated PSCCH transmission may be located in the same subchannel 615*a* of the radio frame 600. For example, the SCI-1 of the PSCCH transmission transmitted via the PSCCH resource 620 may reserve a single subchannel PSSCH resource 610 for transmitting the sidelink data transmission. In such cases, the COT-SI from the COT-initiating UE may be transmitted via a standalone PSCCH resource 605 (e.g., located in a different subchannel 615*b* than the subchannel 615*a* corresponding to the PSCCH resource 620 or the PSSCH resource 610) that is configured for transmitting PSCCH resources. In some aspects, the COT-SI may have the same waveform as that of a SCI-1 message. For instance, the COT-SI may re-use a SCI-1 waveform. Further, the COT-SI may have same payload as a SCI-1 message. In some instances, a UE receiving the COT-SI may decode the COT-SI as if the COT-SI was a SCI-1. That is, the COT-SI may be piggybacked in SCI-1 and the decoding or interpretation of the COT-SI may be embedded in SCI-1.

In some aspects, in addition to or instead of a standalone COT-SI, the COT-initiating UE may transmit a COT-SI coupled to a SCI (e.g., SCI-1 or SCI-2) to receiving UEs to reserve a COT for future use. That is, the SCI may include interpretation signals that allow the receiving UEs to decode or interpret the COT-SI upon reception. For example, the SCI interpretation signals may indicate to the receiving UEs that the receiving UEs may treat (e.g., decode) the COT-SI as if it was a SCI-1. For instance, the SCI interpretation signals may indicate that the COT-SI may have same waveform, same payload size, etc., as that of a SCI-1. In some instances, the SCI interpretation signals may provide a different interpretation that allows the receiving UEs to decode the COT-SI successfully. For example, the SCI interpretation signals may specify a different waveform, payload size, etc. (e.g., different from those of SCI-1) of the COT that allows a UE receiving the SCI interpretation signals and the COT-SI to successfully decode the COT-SI. For instance, if the COT-SI contains fields having a given number of bits, the SCI interpretation may specify what the bits represent (e.g., the offset from the current COT to the COT that is being reserved by the COT-SI, etc.).

In some cases, the COT-SI coupled to the SCI may be transmitted via a PSCCH resource 605 that is in a different subchannel 615*b* from the subchannel 615*a* corresponding to the PSCCH resource 620 or the PSSCH resource 610. That is, for example, the PSSCH resource 610 may still be a single subchannel PSSCH resource 610 that is reserved by the SCI-1 of the PSSCH transmission transmitted via the PSCCH resource 620. The SCI-2 625 coupled to the COT-SI may, however, reserve the subchannel 615*b* of the PSSCH resource 605 that is configured for transmitting PSCCH transmissions (e.g., and used for transmitting the COT-SI). In some instances, the SCI-2 625 may reserve the subchannel 615*a* in which the PSCCH resource 620 and the single subchannel PSSCH resource 610 are located as well as the subchannel 615*b* in which the PSCCH resource 605 via which the COT-SI is transmitted is located.

In some aspects, the SCI-2 625 may rate match according to the PSSCH resource 610 within the same subchannel 615*a*, or may rate match resources (e.g., resource 630) or other resources in the subchannel 615*b* that are surrounding or in the vicinity of the PSCCH resource 605 that is configured to transmit the COT-SI (e.g., the resources located immediately next to the PSCCH resource 605). In some instances, the SCI-2 rate matching may be indicated in a SCI-1 (e.g., via SCI-2 format or CRC scrambling sequence).

In some aspects, the COT-SI generated by the COT-initiating UE to reserve COTs for future use may be transmitted via a channel of the radio frame that is dedicated to or particularly configured for transmitting COT-SI transmissions. For instance, the FT radio frame structure 700 may include a dedicated physical sidelink channel resource 720 that is embedded in the PSSCH resource 710 and configured for transmitting COT-SI transmissions. In some cases, the dedicated physical sidelink channel resource 720 may be pre-configured resources or fixed resources for transmitting COT-SI transmissions, or may be dynamically configured. In some aspects, the dedicated physical sidelink channel resource 720, which may be pre-configured or dynamically configured, may be considered as a resource configured for transmitting a third stage sidelink control information (SCI-3), i.e., the COT-SI. In some instances, the COT-SI may have or use a new waveform (e.g., different from SCI-1 waveform), and the dedicated physical sidelink channel resource 720 may be associated with a new DMRS (i.e., a DMRS different from that of PSSCH or PSCCH).

In some instances, the dedicated physical sidelink channel resource 720 may be dynamically configured or signaled by a SCI-1 or SCI-2 signaling (e.g., similar to beta_offset parameter in Uu and SCI-1 in sidelink communications for indicating the resources used for SCI-2). For example, the COT-SI may be transmitted via the dedicated physical sidelink channel resource 720, which may be embedded within the PSSCH resources 710, may be indicated by the SCI-1 or SCI-2 signaling (e.g., by parameters similar to the afore-mentioned beta_offset parameter), and a UE receiving the signaling may be able to receive and decode the COT-SI based on the indications from the SCI-1 or SCI-2 signaling. For instance, the signaling may indicate what percentage of the PSSCH resources 710 (e.g., in the range from about 10% to about 50%, about 10%, about 20%, about 30%, about 40%, about 50%, etc., including values and subranges therebetween) may be dedicated physical sidelink channel resource 720 that may be used for transmitting COT-SI, and a receiving UE may use this indication or information to receive and decode the COT-SI transmitted via the dedicated physical sidelink channel resource 720 embedded within the PSSCH resources 710. In some instances, the dedicated physical sidelink channel resource 720 may be configured via a RRC message for the receiving UEs sharing the COT initiated by the COT-initiating UE.

In some aspects, the dedicated physical sidelink channel resource 720 for transmitting COT-SI may be configured such that it may be located in the last X symbols of the PSSCH resources 710 (e.g., last 3 symbols). In such instances, the SCI-2 rate matching may not be impacted. Further, the dedicated physical sidelink channel resource 720 may span more than one subchannels. For example, the dedicated physical sidelink channel resource 720 shown in FIG. 7 located within the first subchannel 715*a* may extend into the second subchannel 715*b*. In some instances, as noted above, the dedicated physical sidelink channel resource 720 may be associated with a DMRS that is different from the DMRS associated with PSCCH or PSSCH. That is, the dedicated physical sidelink channel resource 720 may have a dedicated DMRS. In some cases, however, the dedicated physical sidelink channel resource 720 may share DMRS with the PSSCH resources 710 within which it is embedded. In some instances, the COT-SI may not use resources for DMRS (e.g., when the COT-SI collides with the DMRS), but instead may rate-match around DMRS (e.g., to avoid collision).

In some aspects, the configuration of the dedicated physical sidelink channel resource 720 may be such that the COT-SI may be transmitted after the transmission of a SCI-2 705, which may in turn be transmitted after the transmission of SCI-1 via the PSCCH resources 725. That is, a UE sharing the COT with the COT-initiating UE may receive the SCI-1 followed by the SCI-2, which may then be followed by the COT-SI. In some instances, the COT-SI may be front-loaded after SCI-2 mapping. In some cases, this may allow for improved processing time.

In some aspects, the dedicated physical sidelink channel resource 720 may be configured to occupy or be located at fixed location of the radio frame structure 700. For example, the configurations may specify which subchannel or subchannels of the one or more subchannels 715*a*, 715*b* that the dedicated physical sidelink channel resource 720 may span or occupy. In such cases, SCI-2 rate matching may or shall avoid the dedicated physical sidelink channel resource 720 (i.e., the COT-SI resource). In some instances, SCI-1 may indicate the rate-matching pattern (e.g., similar to DCI 1_1 in Uu), which may also indicate the location of the COT-SI.

In some aspects, a combination of the above-discussed configurations (e.g., the location of dedicated physical sidelink channel resource 720 being fixed (e.g., at the last X symbols of the PSSCH resources 710), the transmission of the COT-SI being after that of SCI-2, etc.) may be used for transmitting the COT-SI via the dedicated physical sidelink channel resource 720. In some aspects, the reservation information of the COT-SI may be transmitted by the COT-initiating UE to the receiving UEs using PSSCH resources 710 with SCI-signaling indication (e.g., while omitting a COT-SI transmission).

In some aspects, the COT-SI generated by the COT-initiating UE to reserve COTs for future use may be transmitted via a gap symbol and/or an automatic gain control (AGC) symbol of the radio frame structure. For instance, the FT radio frame structure 800 may include a gap symbol 810 configured to allow a UE time to transition between a transmission mode and receiving mode, and/or a AGC symbol 815 configured to provide the UE time to carry out automatic gain control, i.e., measure the signal strength arriving at the UE and adjust the gain on the receiver amplifier to fit the power of the received signal. In some instances, the gap symbol 810 and the AGC symbol 815 are located at the end of a slot and at the beginning of a slot, respectively, and as such the combination of the gap symbol 810 and the AGC symbol 815 is positioned between two slots 805*a* and 805*b* of the radio frame 800.

In some aspects, the COT-SI may be transmitted using one or both of the gap symbol 810 or the AGC symbol 815 of the radio frame 800. In some instances, for example when a UE (e.g., a receiving UE) has to perform AGC (e.g., AGC is critical), the COT-SI may be transmitted via the gap symbol 810 only. In some instances, the COT-SI may be transmitted via the AGC symbol 815 only. In yet some instances, the COT-SI may be transmitted via both the gap symbol 810 or the AGC symbol 815. For example, the COT-initiating UE may be transmitting back to back transmissions via the slots 805*a* and 805*b* (e.g., to avoid having to perform a LBT procedure), and in such cases, the gap symbol and the AGC symbol may not provide much utility. The former is because neither the transmitting UE nor the receiving UE is switching between transmitting and receiving modes; and the latter is because there may be little or no difference in signal power strength between the back-to-back transmissions. In such cases, the gap symbol 810 and/or the AGC symbol 815 can be used for COT-SI transmissions and the COT-initiating UE may transmit the COT-SI using one or both of these symbols 810, 815 of the radio frame 800.

In some aspects, the SCI-1 carried by the PSCCH transmission via the PSCCH resource 820 and/or the SCI-2 carried by the PSSCH sidelink data transmission via the PSSCH resource 825 may provide indication to receiving UEs that the COT-initiating UE is configured to transmit the COT-SI via the gap symbol 810 and/or the AGC symbol 815. For instance, the SCI-1 and/or the SCI-2 may include an indication of the presence of the COT-SI transmission, i.e., an indication that the COT-initiating UE is configured to transmit the COT-SI, and that the COT-initiating UE may not stop transmission at one or both of the gap symbol 810 and/or the AGC symbol 815. In such cases, the receiving UEs may receive the COT-SI via one or both of the gap symbol 810 and/or the AGC symbol 815, and decode the same to extract the COT-reservation information contained in the COT-SI.

In some aspects, the COT-initiating UE may transmit COT-SI using one or more of the mechanisms discussed above with reference to FIGS. 4-8 (e.g., to avoid half-duplex deafness). For instance, the COT-initiating UE may transmit the COT-SI using a SCI-1 or SCI-2 transmissions, using PSCCH resources associated with a single subchannel resource or a multi-subchannel PSSCH resource, using a dedicated physical sidelink channel resource configured for transmitting COT-SI, and/or using one or both of a gap symbol or a AGC symbol of a radio frame structure.

Figure 9:
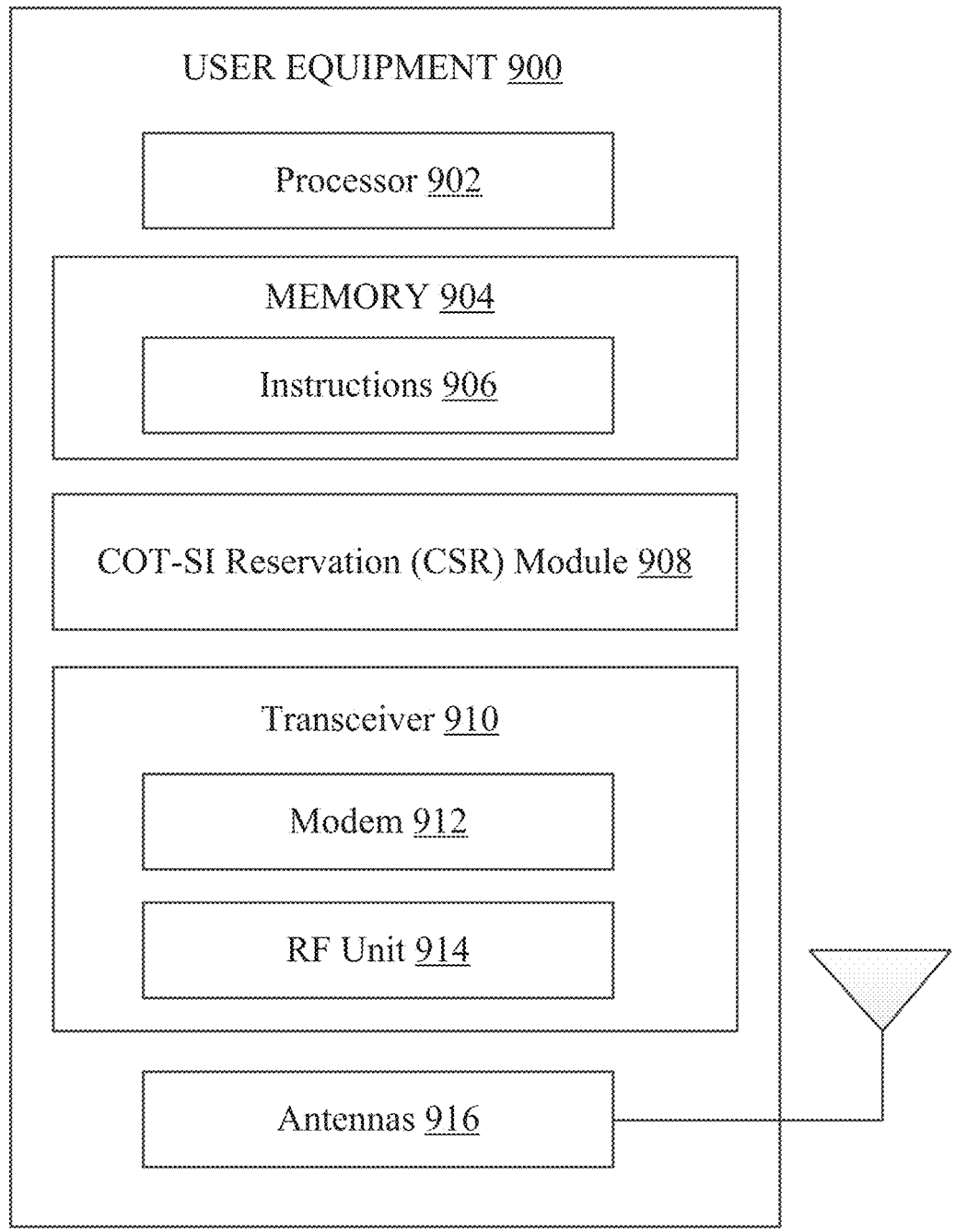
FIG. 9 is a block diagram of an exemplary user equipment (UE) according to some aspects of the present disclosure.

FIG. 9 is a block diagram of an exemplary UE 900 according to some aspects of the present disclosure. The UE 900 may be a UE 115 as discussed above with respect to FIG. 1, or a UE 315 as discussed above with respect to FIG. 3. As shown, the UE 900 may include a processor 902, a memory 904, a COT-SI reservation (CSR) module 908, a transceiver 910 including a modem subsystem 912 and a radio frequency (RF) unit 914, and one or more antennas 916. These elements may be coupled with one another. The term "coupled" may refer to directly or indirectly coupled or connected to one or more intervening elements. For instance, these elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 1-8, and 10. Instructions 906 may also be referred to as program code, which may be interpreted broadly to include any type of computer-readable statement(s). The program code may be for causing a wireless communication device to perform these operations, for example by causing one or more processors (such as processor 902) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The COT-SI reservation (CSR) module 908 may be implemented via hardware, software, or combinations thereof. For example, the CSR module 908 may be implemented as a processor, circuit, and/or instructions 906 stored in the memory 904 and executed by the processor 902. In some examples, the CSR module 908 can be integrated within the modem subsystem 912. For example, the CSR module 908 can be implemented by a combination of software components (e.g., executed by a DSP or a general processor) and hardware components (e.g., logic gates and circuitry) within the modem subsystem 912.

The CSR module 908 may communicate with various components of the UE 900 to perform aspects of the present disclosure, for example, aspects of FIGS. 1-8, and 10. In some aspects, the CSR module 908 is configured to perform a channel access procedure to acquire one or more channel occupancy times (COTs) in a sidelink channel over an unlicensed new radio (NR) band; and transmit a COT sharing information (COT-SI) configured to reserve the one or more COTs for a future transmission via the sidelink channel.

As shown, the transceiver 910 may include the modem subsystem 912 and the RF unit 914. The transceiver 910 can be configured to communicate bi-directionally with other devices, such as the BSs 105. The modem subsystem 912 may be configured to modulate and/or encode the data from the memory 904 and/or the CSR module 908 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., PSCCH, PSSCH, SCI-1, SCI-2, sidelink data, COT-SI, COT sharing information such as but not limited to duration of the COT, time/frequency locations of the reserved COTs, offsets to COT reservations, starting subchannel of reserved COTs, resource widths of reserved COTs, etc.) from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together at the UE 115 to enable the UE 115 to communicate with other devices. In some aspects, the transceiver 910 may be configured to transmit a COT sharing information (COT-SI) configured to reserve one or more COTs in a sidelink channel over an unlicensed new radio (NR) band, the one or more COTs acquired via a channel access procedure by the CSR module 908, for instance, for a future transmission via the sidelink channel.

The RF unit 914 may provide the modulated and/or processed data, e.g. data packets (or, more generally, data messages that may include one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., PSCCH, PSSCH, SCI-1, SCI-2, sidelink data, COT-SI, COT sharing information) to the CSR module 908 for processing. The antennas 916 may include multiple antennas of similar or different designs in order to sustain multiple transmission links. The RF unit 914 may configure the antennas 916.

In an aspect, the UE 900 can include multiple transceivers 910 implementing different RATs (e.g., NR and LTE). In an aspect, the UE 900 can include a single transceiver 910 implementing multiple RATs (e.g., NR and LTE). In an aspect, the transceiver 910 can include various components, where different combinations of components can implement different RATs.

Figure 10:
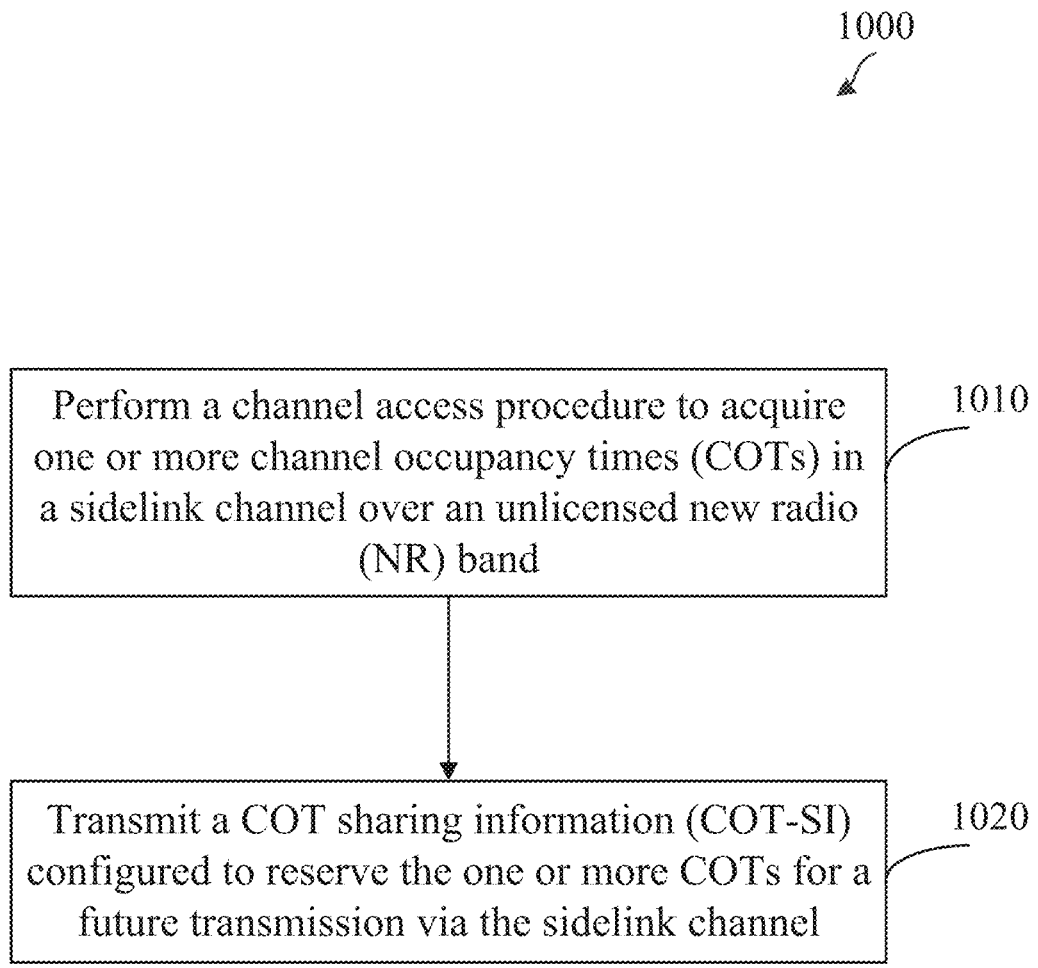
FIG. 10 is a flow diagram of a wireless communication method according to some aspects of the present disclosure.

FIG. 10 is a flow diagram of a COT-SI COT reservation method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UEs 115, or 315, may utilize one or more components, such as the processor 902, the memory 904, the CSR module 908, the transceiver 910, the modem 912, and the one or more antennas 916, to execute the steps of method 1000. The method 1000 may employ similar mechanisms as described above in FIGS. 1-8. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, in some aspects, a first UE (e.g., the UE 115, or 315) performs a channel access procedure to acquire one or more channel occupancy times (COTs) in a sidelink channel over an unlicensed new radio (NR) band.

At block 1020, in some aspects, the first UE transmits a COT sharing information (COT-SI) configured to reserve the one or more COTs for a future transmission via the sidelink channel.

In some aspects of method 1000, the COT-SI is transmitted via a first stage sidelink control information (SCI-1) carried by a physical sidelink control channel (PSCCH) transmission. Further, a number of the one or more COTs can equal a difference between a maximum number of physical sidelink shared channel (PSSCH) reservations the SCI-1 is configured to reserve and a number of one or more PSSCH reservations that the SCI-1 is configured to reserve. In some cases, the SCI-1 includes a field having bit values configured to encode the COT-SI.

In some aspects, the COT-SI is transmitted via a second stage sidelink control information (SCI-2) carried by a physical sidelink shared channel (PSSCH) transmission.

In some aspects, the sidelink channel includes: (a) a first subchannel having: (i) a first resource configured for a PSCCH transmission carrying a SCI-1, and (ii) a second resource configured for a first portion of a multi-channel PSSCH transmission, and (b) a second subchannel having: (i) a third resource configured for the transmitting the COT-SI, and (ii) a fourth resource configured for a second portion of the multi-channel PSSCH transmission, wherein the SCI-1 is configured to reserve the second resource in the first subchannel and the fourth resource in the second subchannel. In some instances, the SCI-1 is configured to include information about the transmitting the COT-SI. Further, the information includes an indication of a presence of the COT-SI at the third resource, and/or a location of the third resource in the sidelink channel. In some instances, the COT-SI is configured to use a SCI-1 waveform. In some instances, the first subchannel includes a fifth resource configured for transmitting a second stage sidelink control information (SCI-2) without rate-matching the SCI-2 to the third resource.

In some aspects, the sidelink channel includes a first subchannel having a first resource configured for transmitting a PSCCH transmission carrying a SCI-1, the SCI-1 configured to reserve a second resource for a single-channel PSSCH transmission in the first subchannel; and the COT-SI is transmitted via a third resource in a second subchannel of the sidelink channel that is different from the first subchannel. In some instances, the COT-SI is configured to have same payload size as the SCI-1. In some instances, the first subchannel includes a fifth resource configured for transmitting a SCI-2 configured to reserve the third resource in the second channel. In some cases, the SCI-1 and/or the SCI-2 include SCI signaling about the COT-SI configured to assist a second UE receiving the COT-SI with decoding the COT-SI. Further, the SCI signaling includes information about a waveform of the COT-SI, a payload size of the COT-SI, and/or a field contained within the COT-SI related to the reserved one or more COTs. In some cases, the waveform of the COT-SI and/or the payload of the COT-SI are different from a waveform of the SCI-1 and/or a payload of the SCI-1, respectively.

In some aspects, the COT-SI is transmitted via a dedicated physical sidelink channel of the sidelink channel that is configured to carry only COT-SI signals. In some instances, the dedicated physical sidelink channel is located within a PSSCH of the sidelink channel, the location being at a last defined number symbols of the PSSCH, at a fixed location within the PSSCH, at any location within the PSSCH after a SCI-2 transmission is completed, or a combination thereof.

In some aspects, the method 1000 may further comprise transmitting a SCI-1 and/or a SCI-2 indicating a resource of the sidelink channel that is configured to transmit the COT-SI.

In some instances, the COT-SI is transmitted via a gap symbol or an automatic gain control (AGC) symbol of the sidelink channel. In some cases, the sidelink channel includes a subchannel having the gap symbol, the AGC symbol, a first resource configured for transmitting a SCI-1, and a second resource configured for transmitting a SCI-2, the SCI-1 and/or the SCI-2 including an indication that the COT-SI is transmitted via the gap symbol or the AGC symbol.

Recitations of Some Aspects of the Present Disclosure

Aspect 1: A method of wireless communication performed by a first user equipment (UE), the method comprising: performing a channel access procedure to acquire one or more channel occupancy times (COTs) in a sidelink channel over an unlicensed new radio (NR) band; and transmitting a COT sharing information (COT-SI) configured to reserve the one or more COTs for a future transmission via the sidelink channel.

Aspect 2: The method of aspect 1, wherein the COT-SI is transmitted via a first stage sidelink control information (SCI-1) carried by a physical sidelink control channel (PSCCH) transmission.

Aspect 3: The method of aspect 2, wherein a number of the one or more COTs equals a difference between a maximum number of physical sidelink shared channel (PSSCH) reservations the SCI-1 is configured to reserve and a number of one or more PSSCH reservations that the SCI-1 is configured to reserve.

Aspect 4: The method of aspect 2, wherein the SCI-1 includes a field having bit values configured to encode the COT-SI.

Aspect 5: The method of any of aspects 1-4, wherein the COT-SI is transmitted via a second stage sidelink control information (SCI-2) carried by a physical sidelink shared channel (PSSCH) transmission.

Aspect 6: The method of any of aspects 1-4, wherein the sidelink channel includes: (a) a first subchannel having: (i) a first resource configured for a PSCCH transmission carrying a SCI-1, and (ii) a second resource configured for a first portion of a multi-channel PSSCH transmission, and (b) a second subchannel having: (i) a third resource configured for the transmitting the COT-SI, and (ii) a fourth resource configured for a second portion of the multi-channel PSSCH transmission, wherein the SCI-1 is configured to reserve the second resource in the first subchannel and the fourth resource in the second subchannel.

Aspect 7: The method of aspect 6, wherein the SCI-1 is configured to include information about the transmitting the COT-SI.

Aspect 8: The method of aspect 7, wherein the information includes an indication of a presence of the COT-SI at the third resource, and/or a location of the third resource in the sidelink channel.

Aspect 9: The method of aspect 6, wherein the COT-SI is configured to use a SCI-1 waveform.

Aspect 10: The method of aspect 6, wherein the first subchannel includes a fifth resource configured for transmitting a second stage sidelink control information (SCI-2) without rate-matching the SCI-2 to the third resource.

Aspect 11: The method of any of aspects 1-10, wherein: the sidelink channel includes a first subchannel having a first resource configured for transmitting a PSCCH transmission carrying a SCI-1, the SCI-1 configured to reserve a second resource for a single-channel PSSCH transmission in the first subchannel; and the COT-SI is transmitted via a third resource in a second subchannel of the sidelink channel that is different from the first subchannel.

Aspect 12: The method of aspect 11, wherein the COT-SI is configured to have same payload size as the SCI-1.

Aspect 13: The method of aspect 11, wherein the first subchannel includes a fifth resource configured for transmitting a SCI-2 configured to reserve the third resource in the second channel.

Aspect 14: The method of aspect 13, wherein the SCI-1 and/or the SCI-2 include SCI signaling about the COT-SI configured to assist a second UE receiving the COT-SI with decoding the COT-SI.

Aspect 15: The method of aspect 14, wherein the SCI signaling includes information about a waveform of the COT-SI, a payload size of the COT-SI, and/or a field contained within the COT-SI related to the reserved one or more COTs.

Aspect 16: The method of aspect 15, wherein the waveform of the COT-SI and/or the payload of the COT-SI are different from a waveform of the SCI-1 and/or a payload of the SCI-1, respectively.

Aspect 17: The method of any of aspects 1-16, wherein the COT-SI is transmitted via a dedicated physical sidelink channel of the sidelink channel that is configured to carry only COT-SI signals.

Aspect 18: The method of aspect 15, wherein the dedicated physical sidelink channel is located within a PSSCH of the sidelink channel, the location being at a last defined number symbols of the PSSCH, at a fixed location within the PSSCH, at any location within the PSSCH after a SCI-2 transmission is completed, or a combination thereof.

Aspect 19: The method of any of aspects 1-18, further comprising transmitting a SCI-1 and/or a SCI-2 indicating a resource of the sidelink channel that is configured to transmit the COT-SI.

Aspect 20: The method of any of aspects 1-19, wherein the COT-SI is transmitted via a gap symbol or an automatic gain control (AGC) symbol of the sidelink channel.

Aspect 21: The method of aspect 20, wherein the sidelink channel includes a subchannel having the gap symbol, the AGC symbol, a first resource configured for transmitting a SCI-1, and a second resource configured for transmitting a SCI-2, the SCI-1 and/or the SCI-2 including an indication that the COT-SI is transmitted via the gap symbol or the AGC symbol.

Aspect 22: A first user equipment (UE), comprising: a memory; a processor coupled to the memory; and a transceiver coupled to the processor, the first UE configured to perform the methods of aspects 1-21.

Aspect 23: A non-transitory computer-readable medium (CRM) having program code recorded thereon, the program code comprises code for causing a first UE to perform the methods of aspects 1-21.

Aspect 24: A first user equipment (UE) comprising means for performing the methods of aspects 1-21.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
    performing a channel access procedure to acquire a current channel occupancy time (COT) and one or more future COTs in a sidelink channel over an unlicensed new radio (NR) band, wherein a number of the acquired COTs equals a difference between a maximum number of physical sidelink shared channel (PSSCH) reservations a first stage sidelink control information (SCI-1) is configured to reserve and a number of one or more PSSCH reservations that the SCI-1 is configured to reserve;
    transmitting, via the SCI-1, COT sharing information (COT-SI) indicating a structure of the current COT; and
    transmitting a plurality of physical sidelink shared channel (PSSCH) reservations, with a first subset of the plurality of PSSCH reservations in the current COT and a second subset of the plurality of PSSCH reservations in the one or more future COTs.

2. The method of claim 1, wherein the COT-SI is transmitted via the SCI-1 carried by a physical sidelink control channel (PSCCH) transmission.

3. The method of claim 2, wherein the SCI-1 includes a field having bit values configured to encode the COT-SI.

4. The method of claim 1, wherein the COT-SI is transmitted via second stage sidelink control information (SCI-2) carried by a physical sidelink shared channel (PSSCH) transmission.

5. The method of claim 1, wherein the sidelink channel includes:
   (a) a first subchannel having: (i) a first resource configured for a PSCCH transmission carrying the SCI-1, and (ii) a second resource configured for a first portion of a multi-channel PSSCH transmission, and
   (b) a second subchannel having: (i) a third resource configured for the transmitting the COT-SI, and (ii) a fourth resource configured for a second portion of the multi-channel PSSCH transmission,
   wherein the SCI-1 is configured to reserve the second resource in the first subchannel and the fourth resource in the second subchannel.

6. The method of claim 5, wherein the SCI-1 is configured to include information about the transmitting the COT-SI.

7. The method of claim 6, wherein the information includes an indication of at least one of a presence of the COT-SI at the third resource, or a location of the third resource in the sidelink channel.

8. The method of claim 5, wherein the COT-SI is configured to use a SCI-1 waveform.

9. The method of claim 5, wherein the first subchannel includes a fifth resource configured for transmitting second stage sidelink control information (SCI-2) without rate-matching the SCI-2 to the third resource.

10. The method of claim 1, wherein:
    the sidelink channel includes a first subchannel having a first resource configured for transmitting a PSCCH transmission carrying the SCI-1, the SCI-1 configured to reserve a second resource for a single-channel PSSCH transmission in the first subchannel; and
    the COT-SI is transmitted via a third resource in a second subchannel of the sidelink channel that is different from the first subchannel.

11. The method of claim 10, wherein the COT-SI is configured to have a same payload size as the SCI-1.

12. The method of claim 10, wherein the first subchannel includes a fifth resource configured for transmitting second stage sidelink control information (SCI-2) configured to reserve the third resource in the second subchannel.

13. The method of claim 12, wherein at least one of the SCI-1 or the SCI-2 include SCI signaling about the COT-SI configured to assist a second UE receiving the COT-SI with decoding the COT-SI.

14. The method of claim 13, wherein the SCI signaling includes at least one of information about a waveform of the COT-SI, a payload size of the COT-SI, or a field contained within the COT-SI related to the acquired COTs.

15. The method of claim 14, wherein at least one of:
    the waveform of the COT-SI is different from a waveform of the SCI-1; or
    the payload of the COT SI is different from a payload of the SCI-1.

16. The method of claim 1, wherein the COT-SI is transmitted via a dedicated physical sidelink channel of the sidelink channel that is configured to carry only COT-SI signals.

17. The method of claim 16, wherein the dedicated physical sidelink channel is located within a physical sidelink shared channel (PSSCH) of the sidelink channel, the location being at a last defined number symbols of the PSSCH, at a fixed location within the PSSCH, at any location within the PSSCH after a SCI-2 transmission is completed, or a combination thereof.

18. The method of claim 1, further comprising transmitting at least one of the SCI-1 or second stage sidelink control information (SCI-2) indicating a resource of the sidelink channel that is configured to transmit the COT-SI.

19. The method of claim 1, wherein the COT-SI is transmitted via a gap symbol or an automatic gain control (AGC) symbol of the sidelink channel.

20. The method of claim 19, wherein the sidelink channel includes a subchannel having the gap symbol, the AGC symbol, a first resource configured for transmitting the SCI-1, and a second resource configured for transmitting second stage sidelink control information (SCI-2),
    wherein at least one of the SCI-1 or the SCI-2 includes an indication that the COT-SI is transmitted via the gap symbol or the AGC symbol.

21. A user equipment (UE), comprising:
    a memory;
    a transceiver; and
    at least one processor coupled to the memory and the transceiver, wherein the UE is configured to:
    perform a channel access procedure to acquire a current channel occupancy time (COT) and one or more future COTs in a sidelink channel over an unlicensed new radio (NR) band, wherein a number of the acquired COTs equals a difference between a maximum number of physical sidelink shared channel (PSSCH) reservations first stage sidelink control information (SCI-1) is configured to reserve and a number of one or more PSSCH reservations that the SCI-1 is configured to reserve;
    transmit, via the SCI-1, COT sharing information (COT-SI) indicating a structure of the current COT; and
    transmit a plurality of PSSCH reservations, with a first subset of the plurality of PSSCH reservations in the current COT and a second subset of the plurality of PSSCH reservations in the one or more future COTs.

22. The UE of claim 21, wherein the COT-SI is transmitted via at least one of the SCI-1 carried by a physical sidelink control channel (PSCCH) transmission or second stage sidelink control information (SCI-2) carried by a physical sidelink shared channel (PSSCH) transmission.

23. The UE of claim 21, wherein the sidelink channel includes:
    (a) a first subchannel having: (i) a first resource configured for a PSCCH transmission carrying the SCI-1, and (ii) a second resource configured for a first portion of a multi-channel PSSCH transmission, and
    (b) a second subchannel having: (i) a third resource configured for the transmitting the COT-SI, and (ii) a fourth resource configured for a second portion of the multi-channel PSSCH transmission,
    wherein the SCI-1 is configured to reserve the second resource in the first subchannel and the fourth resource in the second subchannel.

24. The UE of claim 21, wherein:
the sidelink channel includes a first subchannel having a first resource configured for transmitting a PSCCH transmission carrying the SCI-1, the SCI-1 configured to reserve a second resource for a single-channel PSSCH transmission in the first subchannel; and
the COT-SI is transmitted via a third resource in a second subchannel of the sidelink channel that is different from the first subchannel.

25. The UE of claim 21, wherein the COT-SI is transmitted via a dedicated physical sidelink channel of the sidelink channel that is configured to carry only COT-SI signals.

26. The UE of claim 21, wherein the UE is further configured to transmit at least one of the SCI-1 and/or second stage sidelink control information (SCI-2) indicating a resource of the sidelink channel that is configured to transmit the COT-SI.

27. The UE of claim 21, wherein the COT-SI is transmitted via a gap symbol or an automatic gain control (AGC) symbol of the sidelink channel.

28. A non-transitory computer-readable medium (CRM) having program code recorded thereon, the program code comprising:
code for causing a user equipment (UE) to perform a channel access procedure to acquire a current channel occupancy time (COT) and one or more future COTs in a sidelink channel over an unlicensed new radio (NR) band, wherein a number of the acquired COTs equals a difference between a maximum number of physical sidelink shared channel (PSSCH) reservations a first stage sidelink control information (SCI-1) is configured to reserve and a number of one or more PSSCH reservations that the SCI-1 is configured to reserve;
code for causing the UE to transmit, via the SCI-1, COT sharing information (COT-SI) indicating a structure of the current COT; and
code for causing the UE to transmit a plurality of PSSCH reservations, with a first subset of the plurality of PSSCH reservations in the current COT and a second subset of the plurality of PSSCH reservations in the one or more future COTs.

29. A user equipment (UE), comprising:
means for performing a channel access procedure to a current channel occupancy time (COT) and one or more future COTs in a sidelink channel over an unlicensed new radio (NR) band, wherein a number of the acquired COTs equals a difference between a maximum number of physical sidelink shared channel (PSSCH) reservations a first stage sidelink control information (SCI-1) is configured to reserve and a number of one or more PSSCH reservations that the SCI-1 is configured to reserve;
means for transmitting, via the SCI-1, COT sharing information (COT-SI) indicating a structure of the current COT; and
means for transmitting a plurality of PSSCH reservations, with a first subset of the plurality of PSSCH reservations in the current COT and a second subset of the plurality of PSSCH reservations in the one or more future COTs.

\* \* \* \* \*